(12) United States Patent
Friedrich

(10) Patent No.: US 9,834,904 B2
(45) Date of Patent: Dec. 5, 2017

(54) QUICK-COUPLER

(71) Applicant: KINSHOFER GMBH, Waakirchen (DE)

(72) Inventor: Thomas Friedrich, Schliersee (DE)

(73) Assignee: KINSHOFER GMBH, Waakirchen (DE)

( * ) Notice: Subject to any disclaimer, the term of this patent is extended or adjusted under 35 U.S.C. 154(b) by 811 days.

(21) Appl. No.: 14/292,462

(22) Filed: May 30, 2014

(65) Prior Publication Data

US 2014/0356059 A1 Dec. 4, 2014

(30) Foreign Application Priority Data

May 31, 2013 (DE) .................... 20 2013 005 000 U

(51) Int. Cl.
*E02F 3/96* (2006.01)
*E02F 3/36* (2006.01)

(52) U.S. Cl.
CPC ............ *E02F 3/3663* (2013.01); *E02F 3/365* (2013.01); *E02F 3/3618* (2013.01); *Y10T 403/581* (2015.01)

(58) Field of Classification Search
CPC ....... E02F 3/3618; E02F 3/3622; E02F 3/365; E02F 3/3663; Y10T 403/604;

(Continued)

(56) References Cited

U.S. PATENT DOCUMENTS 5,727,442 A 3/1998 Wimmer
6,699,001 B2 * 3/2004 Fatemi .................. E02F 3/3618
37/468

(Continued)

FOREIGN PATENT DOCUMENTS

DE 60215289 T2 5/2007
EP 1852555 A2 11/2007
(Continued)

OTHER PUBLICATIONS

German Search Report dated Nov. 24, 2014, issued in German Patent Application No. 202014004430.9 (5 pages).
(Continued)

*Primary Examiner* — Robert Pezzuto
(74) *Attorney, Agent, or Firm* — Westerman, Hattori, Daniels & Adrian, LLP

(57) ABSTRACT

A quick-coupler for coupling a tool, including a coupling mount for receiving a first locking part and a locking mount for receiving a second locking part, wherein a securing element, which can be actuated by a pressure medium, is associated with the coupling mount for capturing and/or securing the first locking part in the coupling mount and a locking element, which can be actuated by a pressure medium, is associated with the locking mount for locking the second locking part in the locking mount. The securing element of the coupling mount can likewise be actuated by the pressure circuit for actuating the locking element of the locking mount, with the securing element being connected to the pressure circuit via a switching valve which is controllable by a sensor arranged at the coupling mount for detecting the locking part.

18 Claims, 20 Drawing Sheets

(58) Field of Classification Search
CPC .............. Y10T 403/60; Y10T 403/591; Y10T 403/608; Y10T 403/581
USPC .......... 37/468, 403–409; 172/272–275, 812; 414/723, 724; 403/31, 320, 322.3, 322.1, 403/325, 331
See application file for complete search history.

(56) References Cited

U.S. PATENT DOCUMENTS

| | | | |
|---|---|---|---|
| 6,964,122 B2 * | 11/2005 | Cunningham | ........ E02F 3/3618 37/468 |
| 8,782,931 B2 * | 7/2014 | Balemi | ................ E02F 3/3618 37/468 |
| 2004/0244575 A1 | 12/2004 | Fatemi et al. | |
| 2006/0237201 A1 | 10/2006 | Moriuchi | |
| 2011/0313625 A1 | 12/2011 | Miller et al. | |

FOREIGN PATENT DOCUMENTS

| | | |
|---|---|---|
| EP | 2 161 378 A1 | 3/2010 |
| WO | 2014/098616 A1 | 6/2014 |

OTHER PUBLICATIONS

British Search Report dated Aug. 13, 2014, issued in corresponding British Application No. GB1409640.8. (3 pages).

\* cited by examiner

QUICK-COUPLER

BACKGROUND OF THE INVENTION

The present invention relates to a quick-coupler for coupling a tool such as an excavator bucket, a clamshell grapple or demolition shears to a tool guide such as an excavator arm or the like, comprising a coupling mount for receiving a first locking part and a locking mount for receiving a second locking part, wherein a securing medium, which can be actuated by a pressure medium, is associated with the coupling mount for capturing and/or securing the first locking part in the coupling mount and a locking element, which can be actuated by a pressure medium, is associated with the locking mount for locking the second locking part in the locking mount.

Quick-couplers are frequently used with construction machines such as hydraulic excavators or articulated grippers such as wood handling machines or demolition units or similar material transfer machinery for coupling different tools such as rakers, clamshell grapples or demolition shears to an excavator arm or similar tool guides such as articulated arm booms in order to be able to use different tools without long changeover times. Such quick-couplers can in particular have two mutually spaced apart locking axles as locking elements at a coupling part, whereas the other coupling part, in particular the coupling part at the excavator arm side can have a preferably hook-shaped coupling mount for hooking at a first one of the two locking axles and a locking mount for locking at the second locking axle. After hooking the first locking axle in the coupling mount, the two coupling parts can be pivoted with respect to one another, wherein the locking axle seated in the coupling mount forms the pivot axle so that the second locking axle moves or is pivoted into the locking mount where the named second locking axle can then be locked by a locking element such as an extendable wedge so that it is simultaneously also no longer possible to move the first locking axle out of the coupling mount. The named locking axles at the one coupling part can in this respect be formed by locking pins which can extend at the corresponding coupling part, in particular in parallel with one another, with optionally instead of such pins also other structural parts of the coupling part such as projecting noses, axle pivots, engagement stubs in the form of projections or recesses, for example in the form of pockets, being able to serve as the locking part, however, and being shape-matched to the coupling mount or to the locking mount of the other coupling part.

It has already been proposed for the prevention of the first locking axle from being released from the coupling mount again on the named pivot process after the hooking of the named first locking axle into the coupling mount to associate a securing element, for example in the form of a spring-loaded snap-in wedge, to the coupling mount, with the snap-in wedge capturing the locking axle on the hooking of the locking axle into the coupling mount and securing it in the coupling mount. On the moving of the locking axle into the coupling mount, the securing snap lock is pressed back until the completely hooked-in position is reached so that the securing snap lock can snap back again and can block the exit path from the coupling mount. To be able also to move the first locking axle or to unhook it from the coupling mount on the removal of a tool after the unlocking of the locking mount, this securing element hast to be released again or has to be moved into its releasing position again. This can take place with pressure medium actuation, for example by a simply acting pressure medium cylinder which can move the securing element back into the releasing position against its spring pre-loading into the locking or blocking position. A climbing down of the machine operator or a manual actuation can hereby be avoided.

To make the actual locking mechanism, which transmits force in operation and by which the second locking element, for example in the form of a locking axle, is fixed or locked in the locking mount, independent of the actuation of the securing element associated with the coupling mount, the enabling or release of the named securing element at the coupling mount is effected by a separate pressure medium circuit which can be controlled independently of or is configured separately from the pressure medium circuit for actuating the locking mechanism. The decoupling is carried out to prevent problems at the securing element from being able to spread to the actual locking mechanism and from being able to effect an unwanted release of the coupling locking in operation. Such problems could, for example, be pressure losses at sealing elements, for example, which are provided in pressure circuit sections leading to the securing element of the coupling mount. The document EP 1852555 A2, for example, shows such a quick-coupler having mutually decoupled, separate pressure circuits for the actuation of the locking mechanism and for the unlocking of the securing element at the coupling mount.

Since in practice in the past quick-couplers of the named type, which were sold in large volumes and which are still in use today, were/are not provided with such an additional securing element at the coupling mount, it would be desirable not only to provide such an additional securing means at the coupling mount with new devices, i.e. new quick-couplers, but also to be able to retrofit them to old quick-couplers. The solution shown in the named document EP 1852555 A2 is admittedly generally also suitable for retrofitting already existing quick-couplers, but it requires three hydraulic connections due to the separate pressure circuit for actuating the securing element of the coupling mount, namely two connections for actuating the actual locking mechanism and a further pressure connection for unlocking the securing element of the coupling mount. In many cases, however, only two hydraulic connections are present at existing devices so that the retrofitting with such an additional securing means at the coupling mount is often not possible.

BRIEF SUMMARY OF THE INVENTION

Starting from this, it is the underlying object of the present invention to provide an improved quick-coupler of the named type which avoids disadvantages of the prior art and further develops the latter in an advantageous manner. In particular, an additional securing means should be provided at the coupling mount which is simple to actuate and which does not require an increased number of pressure medium connections.

This object is achieved in accordance with the invention by a quick-coupler in accordance with claim 1. Preferred embodiments of the invention are the subject of the dependent claims.

It is therefore proposed to actuate the actual locking unit at the locking mount of the quick-coupler, which transmits force in operation, and the additional securing means at the coupling mount by a common pressure circuit and in so doing to provide an intelligent connection of the additional securing means at the named pressure circuit which takes account of the presence or absence of the first locking part in the coupling mount. Depending on whether and in which phase of the coupling process the first locking part in the coupling mount is, the unlocking pressure or the locking pressure of the main lock is connected to or disconnected from the setting actuator of the securing element of the additional securing means. Provision is made in accordance with the invention that the securing element of the coupling mount can likewise be actuated by the pressure circuit for actuating the locking element of the locking mount, with the securing element being connected to the pressure circuit via a switching valve which is controllable by a sensor arranged at the coupling mount for detecting the locking part. The sensor detects whether the first locking part is in the coupling mount or is moving into it or is moving out of it and controls the switching valve to connect the securing element of the coupling mount in a suitable manner selectively to the unlocking pressure connection, to the locking pressure connection and/or to the tank of the pressure circuit.

The named sensor can in this respect have a different connection; it can, for example, comprise a sensor of contactless operation. In an advantageous further development of the invention, however, the sensor can have a mechanical configuration operating with contact and can detect the locking part in or at the coupling mount in a tactile manner. The sensor can in particular have a movably supported sensor head which can be actuated by the first locking part moving into and/or moving out of the coupling mount. The moving-in locking part can press back or pivot away the sensor head or move it in another manner, which the sensor can convert into a setting movement of the switching valve. For this purpose, the sensor can optionally also be coupled or connected directly, or also indirectly via a valve arrangement, to the switching valve by a suitable coupling member and/or connection member. In addition to a mechanical connection of the sensor to the switching valve, a hydraulic connection, or optionally also a pneumatic connection, of the sensor to the switching valve can be provided, with the setting movement of the sensor influencing the valve position of the aforesaid valve arrangement with a hydraulic/pneumatic connection, which is then converted into an influencing of the switching position of the switching valve which controls the securing element of the coupling mount.

To be able to control the action of the locking pressure or unlocking pressure of the common pressure circuit on the securing element not only in dependence on the sensed position of the first locking part in or at the coupling mount, but also to be able to take account of the switching state of the pressure circuit and/or the locking state of the main lock, the named sensor can—in particular on a mechanical configuration of the connection of the sensor to the switching valve—comprise in an advantageous further development of the invention a sensor coupling which can be brought into different switching positions and which permits or does not permit movements of the switching valve with respect to the sensor head in dependence on the switching position or which provides the switching valve with a freedom of movement with respect to the sensor head or necessarily converts a sensor head movement into a switching position of the switching valve.

The named sensor coupling can in particular be configured in the manner of a ballpoint pen mechanism and can be configured as switching between two coupling states cyclically by a sensor actuation. The named sensor coupling can in particular have the property that the sensor coupling switches into a blocking connection and/or connects the sensor head to the switching valve in a movement transmitting manner in at least one direction when the sensor head moves out completely or moves into its base position with an empty coupling mount, for example by a corresponding spring preload or induced by the moving of the locking part out of the coupling mount. If the sensor coupling is switched into the movement-transmitting position by a complete moving out, a moving of the locking part into the coupling mount produces a corresponding sensor movement which is then converted into a corresponding switch movement of the switching valve.

On the other hand, the sensor coupling can have the property that the sensor coupling is switched into a freedom of movement position or a free running position or that the sensor head is given a freedom of movement with respect to the switching valve when the sensor head is completely moved in or that the sensor head was completely forced into the coupling position by the locking part moving into the coupling mount. In this freedom of movement position of the sensor coupling, the switching position of the switching valve can then be influenced in a different manner, for example by a hydraulic pressure from the pressure circuit and/or by a spring preload. On the one hand, the moving of the locking part into and out of the coupling mount can hereby be converted into a defined switching position of the switching valve; on the other hand, the switching valve can also be actuated in a different manner depending on the state in which the sensor coupling is.

The named sensor coupling can in principle work in the same way as a ballpoint pen mechanism known from ballpoint pens. The sensor coupling can in particular have a transfer means which differs in length in dependence on the switching position, which is arranged between the movably supported sensor head and the switching valve and which can move the switching valve into a specific switching position in the manner of a plunger. If the transfer means is fixed to the sensor head in its long position, the sensor head can press the switching valve away; if, however, the transfer means is only fixed to the sensor head in its short position or has freedom of movement with respect to the sensor head, the switching valve can move with respect to the sensor head even if the sensor head is moving toward the switching valve.

The technical pressure-control connection of the securing element of the coupling mount to the pressure circuit of the main lock can generally have different properties. In an advantageous further development of the invention, the named switching valve can comprise at least two switching positions in which the switching valve connects the unlocking pressure side and/or the locking pressure side and/or the pressureless tank connection of the pressure circuit to the at least one setting actuator of the securing element of the coupling mount or guides it therepast in different manners. In an advantageous further development, the switching valve can in this respect be preloaded into a first of the named at least two switching positions, for example by a spring device, and can be connected to the pressure circuit via a control pressure line to bring the switching valve against the named preload into the second switching position at a control pressure branched off from the pressure circuit.

Depending on the configuration of the pressure circuit and on the connection of the main lock, the named control pressure line can in this respect be connected at different points or pressure lines of the pressure circuit and the switching valve can be connected to the locking pressure side and/or unlocking pressure side of the pressure circuit of the main lock in different manners. In accordance with an advantageous embodiment of the invention, the control pressure for the switching valve can be derived from the locking pressure side of the pressure circuit with which the main lock is locked and/or the control pressure line can be connected to a locking pressure line for locking the locking element of the locking mount in order then to bring the switching valve into the previously named second switching position via the control pressure when the main lock is locked or is acted on by locking pressure.

In particular when the locking pressure of the main lock is used as the control pressure for the switching valve, it can be advantageous that in the first switching position the switching valve connects the unlocking pressure line for unlocking the main lock to an unlocking chamber of the securing element of the coupling mount and/or switches an optionally present locking chamber of the named securing element to a tank of the system and/or to the locking pressure line of the main lock in a pressureless manner. The switching valve can namely in particular be in the first switching position when no control pressure forces the switching valve into the second switching position, i.e. no locking pressure is applied to the main lock, but rather, for example, an unlocking pressure is present for unlocking the main lock. The unlocking chamber of the securing element is accordingly likewise acted on by the unlocking pressure so that the additional lock also unlocks. Any fluid possibly still present in the locking chamber of the securing element can flow out via the locking pressure line of the main lock or optionally also directly into the tank.

Alternatively or additionally, in the second switching position, the switching valve can connect the locking pressure line of the main lock to a locking chamber of the securing element of the coupling mount or can transfer the locking pressure of the main lock to an optionally present locking chamber of the securing element; and/or, on the other hand, can connect the unlocking chamber of the securing element to the tank in a pressureless manner, optionally directly or via the unlocking pressure line which will be pressureless as a rule when the locking pressure side of the main lock is pressurized.

The setting actuator for the securing element of the coupling mount can generally be of different designs. In accordance with an advantageous embodiment of the invention, a dual action setting actuator can be connected to the named securing element, with the named setting actuator having an unlocking chamber and a locking chamber to be able to unlock and lock the securing element depending on which of the two pressure chambers is pressurized. A single setting actuator for the securing element can be sufficient with such a dual action design of the setting actuator.

In an alternative further development of the invention, however, two single-action setting actuators can also be provided for locking or unlocking the securing element, in particular such that the setting cylinders can each only move the securing element in one direction in accordance with the plunger principle. The one setting actuator has a locking chamber and forms the locking cylinder which locks the securing element on pressurization and in so doing moves the unlocking cylinder back, while the other cylinder forms the unlocking cylinder and has an unlocking chamber on whose pressurization the securing element is unlocked and the locking cylinder is moved back.

In a further alternative embodiment of the invention, however, work can also be carried out with only a single-action setting cylinder at the securing element, in particular when the securing element is preloaded into a position by a preloading device, for example, in the form of a spring device. The securing element can in particular be preloaded into the locking position and/or can be configured and arranged such that the securing element is pressed open on the moving of the first locking part into the coupling mount and automatically snaps back into the locking position under the preloading force when the securing element is at least approximately fully moved into the coupling mount. The setting actuator can be used to unlock the securing element against the preload, with the setting actuator forming an unlocking cylinder and having an unlocking chamber which can be pressurized in the aforesaid manner via the switching valve or can be drained toward the tank.

If work is only carried out with a single-action setting actuator for the securing element, the locking pressure line of the main line can be connected to the control input of the valve to utilize the locking pressure as the control pressure and/or can, on the other hand, be connected to a backflow connection of the switching valve, in particular with an interposition of a check valve which only allows the outflow from the switching valve back into the—then pressureless—locking pressure line. A switching through of the locking pressure onto the setting actuator of the securing element of the additional securing means does not have to be provided. In a switching position, the switching valve switches the unlocking pressure line of the main lock through to the unlocking chamber of the securing element, while in a second switching position, the switching valve switches the unlocking chamber of the securing element through to the tank of the system to allow the locking of the securing element, whether by a direct connection to the tank or via the named check valve-connected connection line to the locking pressure line, which is then pressureless.

The switching valve associated with or connected upstream of the securing element of the coupling mount does not have to be mechanically coupled to the sensor, but can also be hydraulically connected to the sensor, and indeed in particular via a valve arrangement by which the switching valve is controlled via a valve arrangement by the coupling part moving into the coupling mount on the displacement of the sensor such that the securing element or the actuator connected thereto can also be moved into the locking position on a pressurization of the unlocking pressure connection. The valve arrangement in particular only starts to control the switching valve when the coupling part is completely moved into the coupling mount and the valve connection is actuated via the sensor. The switching valve which is controlled by the valve arrangement and is actuated by pressure medium in this respect allows a movement of the securing element or of the actuator associated with it, without the pressurizing by the unlocking pressure connection on the locking pressure connection having to be switched over for this purpose. A fast and automatic securing of the coupling part in the coupling mount can hereby be achieved.

The switching element for the securing element actuated by pressure medium can be controlled by the valve arrangement such that the actuator of the securing element remains in the desired locking position with a moved in sensor and on a change of the pressurization from the unlocking pressure connection to the locking pressure actuation. An unwanted release of the coupling element from the coupling mount can hereby be avoided.

In an advantageous further development of the invention, the named valve arrangement can include two valves which can be switched over by the sensor with a time offset with respect to one another and which can be formed by a first valve and a second valve connected in series thereto. The switching over offset in time can take place, for example, by a spatial offset of the valves in the actuation direction of the sensor or by a corresponding design of the valves. In a starting position with a non-actuated sensor, the first valve can advantageously be opened and the second valve blocked.

In an advantageous further development of the invention, the first valve and the second valve can be configured as spring preloaded directional valves which can ensure a direction-independent free passage in an open position and a check function depending on the flow direction in the blocked position.

The valve arrangement can advantageously comprise a third valve parallel to the aforesaid first valve and connected by the pressure flow downstream of the first valve. This valve can have a self-retaining function such that it is possible to control the switching valve actuated by the sensor and by the valve connection separately from the pressurization of the unlocking or locking pressure medium connection.

The named third valve can ensure a direction-independent free passage in one position and a check function dependent on the flow direction of the pressure medium in another position. For this purpose, the third valve, like the first and second valves, can be formed as a spring preloaded directional valve which ensures a direction-independent free passage in the open position and a check function dependent on the flow direction in the blocked position. To enable the self-retaining function, the third valve can be controlled via a pilot line, with the pressure in the named pilot line switching the third switching valve configured as a directional valve against the force of the spring. Alternatively or additionally, the third valve can be configured as a blockable check valve, with the control of the unblockable check valve likewise being able to take place via a pilot line.

The first valve, the second valve and the sensor can be integrated in a common housing. This allows a particularly compact and robust design with a small number of lines.

The first valve can have a first valve body and the second valve can have a second valve body, with the named valve bodies and the sensor being able to be arranged coaxially with respect to one another and longitudinally displaceably in the housing. A compact and thus space-saving construction is hereby likewise achieved, with a particularly favorable force transmission being made possible by the coaxial arrangement.

The valve bodies can be displaceable with respect to valve seats at the housing so that the aforesaid check valve function or a free passage can be achieved in dependence on the position of the valve bodies relative to the valve seats.

The sensor and the named first valve body can be connected by a spring, in particular such that the first valve body can elastically resiliently contact the valve seat or be raised from the valve seat by the sensor, but with the sensor not being restricted in its movement by the first valve body.

The sensor can be arranged spaced apart from the named second valve body in the housing in a starting position and can have a contact surface for contact at this second valve body so that the sensor can first press the first valve body to the valve seat by the spring and can then raise the second valve body out of the corresponding valve seat by the named contact surface. The aforesaid control of the first and second valves by the sensor offset in time can hereby be achieved within the common housing.

BRIEF DESCRIPTION OF THE DRAWINGS

The invention will be explained in more detail in the following with reference to preferred embodiments and to associated drawings. There are shown in the drawings.

DETAILED DESCRIPTION OF THE INVENTION

Figure 1:
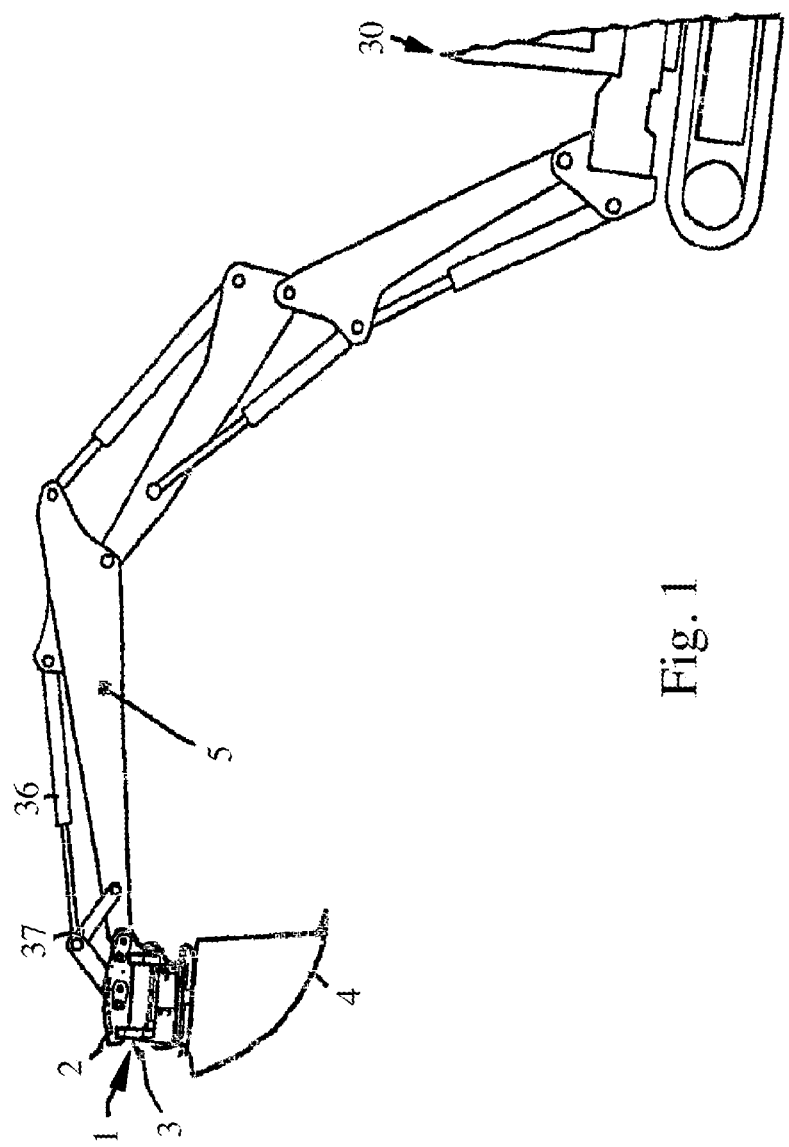
FIG. 1: a schematic side view of a quick-coupler in accordance with an advantageous embodiment of the invention which is attached to a boom arm of an excavator and couples an excavator bucket as an installation tool.

As FIG. 1 shows, the quick-coupler 1 can be installed between the free end of the boom arm 5 of an excavator 30 and the tool 4 to be installed thereat, wherein the named installation tool 4 is configured as an excavation bucket in FIG. 1, but which can naturally also comprise in a basically usual manner other corresponding construction tools, handling tools or demolition tools, for example in the form of clamshell grapples, demolition shears, shears or similar. The named quick-coupler 1 can in this respect, on the one hand, be mounted to the named boom arm 5 by means of a coupler part 2 at the arm side pivotable about a lying pivot axis aligned transversely to the longitudinal axis of the boom arm 5 so that the quick-coupler 1 can be pivoted together with the tool 4 installed thereat, for example by means of a pressure medium cylinder 36 and an interposed pivot piece 37, with respect to the boom arm 5.

Figure 2:
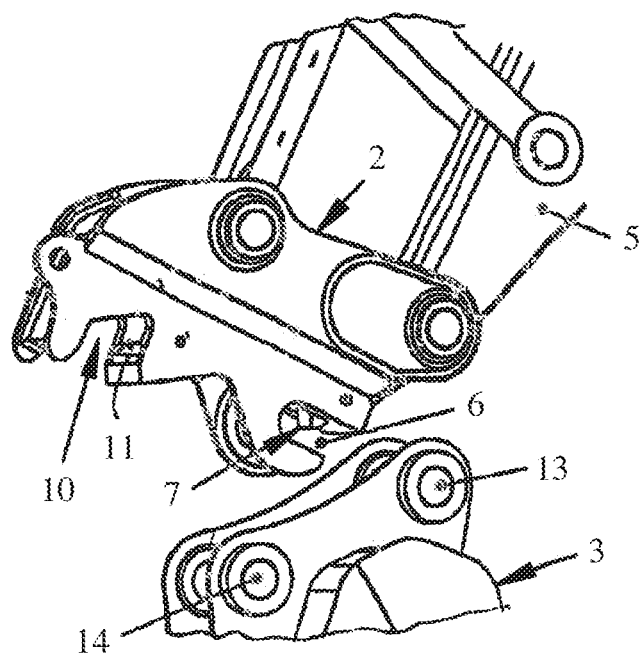
FIG. 2: a perspective representation of the quick-coupler of FIG. 1 in a decoupled position in which the two mutually couplable coupling parts are shown just before the hooking in at the hook section.

The named quick-coupler can, on the other hand, be installed by means of a tool-side coupler part 3—cf. FIG. 2—to the installation tool 4 and/or to an interposed rotational drive.

Figure 3:
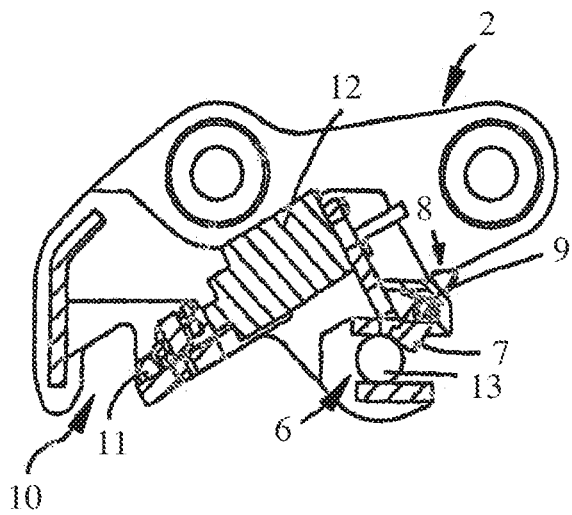
FIG. 3: a sectional view through the coupling part of the quick-coupler of the preceding Figures which shows the coupling mount and the lock mount as well as the associated securing and locking elements and their setting actuators.

As FIGS. 2 and 3 show, one of the two coupling parts 2 and 3 respectively, preferably the coupler part 2 at the arm side, comprise a coupling mount 6, on the one hand, and a locking mount 10, on the other hand, for example in the form of locking axles 13 and 14, which can be hooked in or brought into engagement at the other coupler part 13, preferably at the tool side. Contrary to the representation of the drawing, it would, however, generally also be possible to provide a locking axle and a mount at one coupler part and in turn to provide a locking axle and a mount at the other coupler part, with the embodiment shown with two mounts, i.e. a locking mount and a coupling mount at the one coupler part and two locking axles corresponding thereto at the other coupler part, being preferred, however, since the associated securing elements and locking elements and their actuation can then be combined at one coupler part.

As FIG. 2 shows, the coupling mount 6 and the locking mount 10 each form a mouth-shaped mount which is open toward a side and into which the locking axles 13 and 14 can move which can be formed by cross-pins or locking pins, cf. FIG. 2. In this respect, the coupling mount 6 and the locking mount 10 are advantageously arranged and configured such that when a first locking axle 13 of the one coupler part 3 has moved into or is hooked into the preferably hook-shaped coupling mount 6 of the other coupling part 2, the two coupler parts can be pivoted with respect to one another, and indeed such that the coupling mount 6 and the locking axle 13 received therein form the axis of rotation and the second locking axle 14 can move into the locking mount 10 by the corresponding pivot movement so that the two coupling parts 2 and 3 can be coupled to one another in a two-stage coupling process. The coupling mount 6 is first hooked at the first locking axle 13 so that then the locking mount 10 can be brought into engagement with the second locking axle 14 by pivoting the two coupler parts 2 and 3 relative to one another—which can take place, for example, by actuating the aforesaid pivot cylinder 36. The opening of the coupling mount 6 can advantageously face away from the locking mount 10, cf. FIGS. 2 and 3.

If the second locking axle 14 is moved into the locking mount 10, the named second locking axle 14 is locked in the locking mount 10 or the locking mount 10 is closed so that the second locking axle 14 can no longer move out. For this purpose, a locking element 11 is provided, for example in the form of a locking wedge, which can be moved on the opening side of the locking mount 10 in front of the locking axle 14 received therein, cf. FIG. 3. To actuate the named locking element 11, a hydraulically actuable setting actuator 12 is advantageously provided in this respect which is connected directly or indirectly to the named locking element 11 and is advantageously configured in dual action so that it can be moved forward and backward.

Not only the second locking axle 14 is in this respect held in the locking mount 10 by locking the locking element 11, but the two coupler parts 2 and 3 are also locked to one another since the coupling mount 6 is configured such that the first locking axle 13 received therein cannot move out of the coupling mount 6 when the second locking axle 14 is captured in the locking mount 10.

The named coupling mount 6 nevertheless has a securing element 7 associated with it by means of which the first locking axle 13 or a suitable locking part can be captured or can be secured or can be blocked in the coupling mount 6 so that the first locking axle 13 cannot unintentionally slip out of the coupling mount 6. This securing element 7 primarily serves to prevent an unintentional sliding of the first locking axle 13 out of the coupling mount 6 during the aforesaid pivot movement on the coupling process as long as the two coupler parts 2 and 3 are still not locked to one another by closing the named locking element 11.

The named securing element 7 can likewise be a wedge-shaped slider or also, as FIG. 3 shows, a pivotably supported locking lever which tapers or blocks the opening of the coupling mount 6 so much in its locked position that the first locking axle 13 cannot slide out, cf. FIG. 3.

To actuate the securing element 7 for the purpose of decoupling, the named securing element has at least one setting actuator 8 in the form of a hydraulic cylinder or also a pair of such setting actuators associated with it by means of which the securing element 7 can be moved or pivoted into its released position and/or locking position, as will still be explained.

Figure 4:
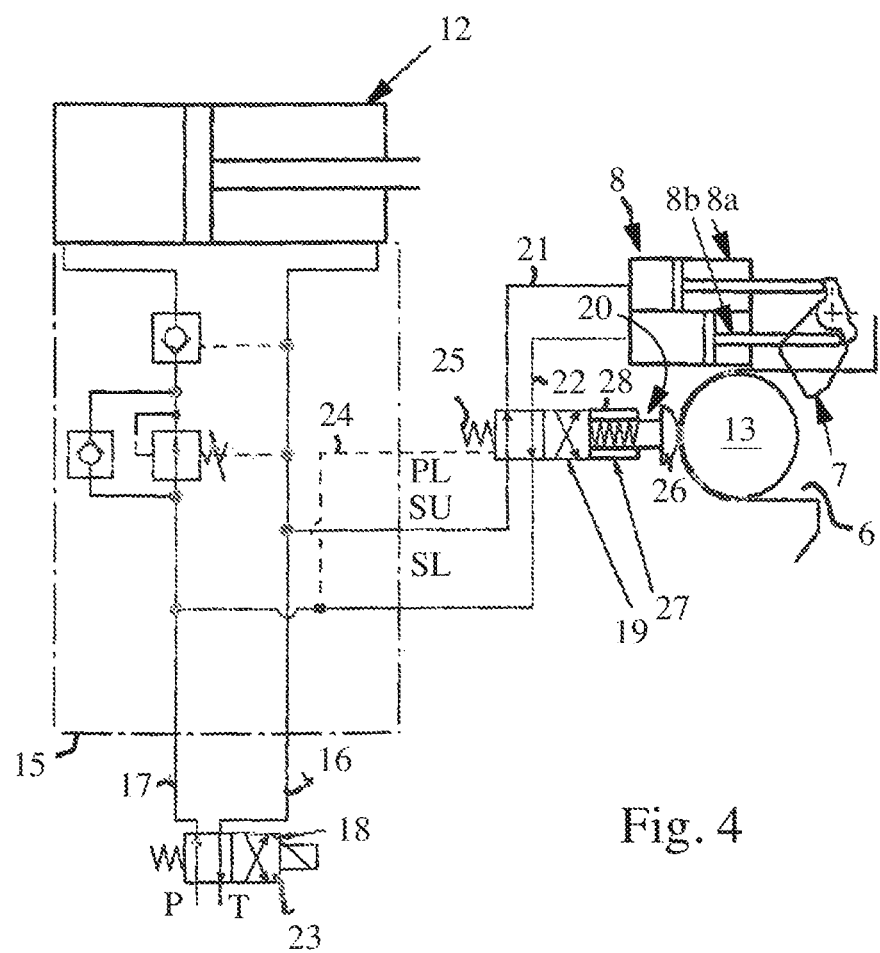
FIG. 4: a circuit diagram of the common pressure circuit for actuating the securing element associated with the coupling mount and the locking element associated with the locking mount, wherein, in accordance with a first embodiment, the securing element can be locked and unlocked by means of two setting actuators and wherein the switching valve connecting the named setting actuators to the common pressure circuit is shown in its operating position with a coupled, completely locked tool.

FIG. 4 shows the control of the two named securing and locking elements 7 and 11 by a common pressure circuit 15. The pressure circuit 15 is in this respect connected, on the one hand, to a pressure source P, for example in the form of a pump, by means of which the pressure circuit 15 is fed with pressure fluid, in particular hydraulic fluid, and is connected, on the other hand, to a tank T into which pressure fluid can flow back. On the other hand, the pressure circuit 15 comprises two pressure connections, namely a locking pressure connection 17, on the one hand, and an unlocking pressure connection 16, on the other hand, to which the dual-action setting actuator 12 of the locking element 11 is connected to be able to release and close the locking of the quick-coupler 1, i.e. to be able to lock and unlock the second locking axle 14 in the locking mount 10. To be able to control this main locking process or unlocking process, the pressure circuit 15 comprises a valve device 18 by means of which the unlocking pressure connection 16 or the locking pressure connection 17 can selectively be connected to the pressure source P.

As FIG. 4 shows, the valve device 18 comprises a switching valve 23 for this purpose which, in a switching position, switches the pressure line coming from the pressure source P through to the locking pressure connection 17 and the unlocking pressure connection 16 through to the tank and, in another switching position, conversely connects the line coming from the pressure source P to the unlocking pressure connection 16 and the locking pressure connection 17 to the tank.

The at least one setting actuator 8 provided for actuating the securing element 7 is connected via a switching valve 19 to the unlocking pressure connection 16.

As FIG. 4 shows, two setting actuators 8a and 8b can be provided for actuating the securing element 7 of which the one setting actuator 8a is provided for unlocking the securing element 7 and the other setting actuator 8b is provided for locking the securing element 7. Both setting actuators 8a and 8b can be configured as single-action and can actuate the securing element 7 in the manner of plungers, with the setting actuators 8a and 8b being coupled to one another via the securing element 7 such that, on the moving out of the one setting actuator, the other setting actuator is moved in and, on the moving out of the other setting actuator, the aforesaid one setting actuator is moved in, cf. FIG. 4. Depending on whether the setting actuators push or pull at the securing element, the respective other setting actuator can be taken along during the pushing or during the pulling.

As FIG. 4 shows, the two setting actuators 8a and 8b can be connected to the pressure circuit 15 via the switching valve 19, with the named switching valve 19 being able to be configured as a 2/2 switching valve, for example. At the input side, the named switching valve 19 can be connected via two pressure lines SU and SL to the unlocking pressure connection 16 and to the locking pressure connection 17 via which connections the pressure of the pressure circuit 15 is transferred to the setting cylinder 12 of the main lock to unlock or lock it. At the output side, the switching valve 19 is connected to the two setting actuators 8a and 8b via two pressure lines 21 and 22, cf. FIG. 4.

The named switching valve 19 can in this respect be actuated in two ways. On the one hand, the pressure of the locking pressure connection 17 can be transferred to the switching valve 19 via a control pressure line 24 to bring the switching valve into the operating position shown in FIG. 4. On the other hand, the switching valve 19 can be connected to a sensor 20 which is arranged at the coupling mount 6 to detect the first locking part 13 moving in there. In addition, the switching valve 19 can be brought into a starting position by a preloading apparatus, for example in the form of a spring 25, if neither the control pressure nor the sensor predefine a specific position of the switching valve 19.

Figure 5:
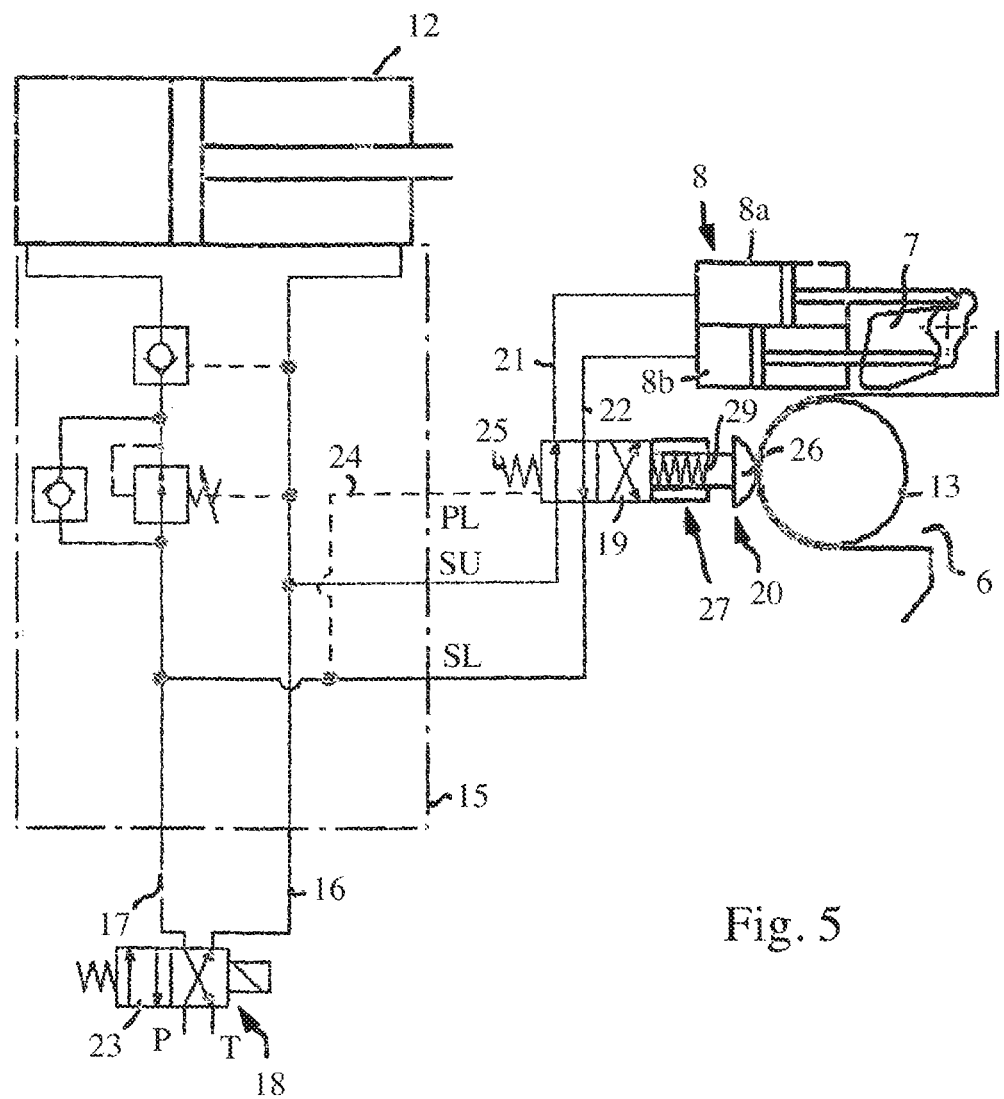
FIG. 5: a representation of the pressure circuit similar to FIG. 4, with a second operating state being shown in which the main lock and the securing element are being unlocked.
Figure 6:
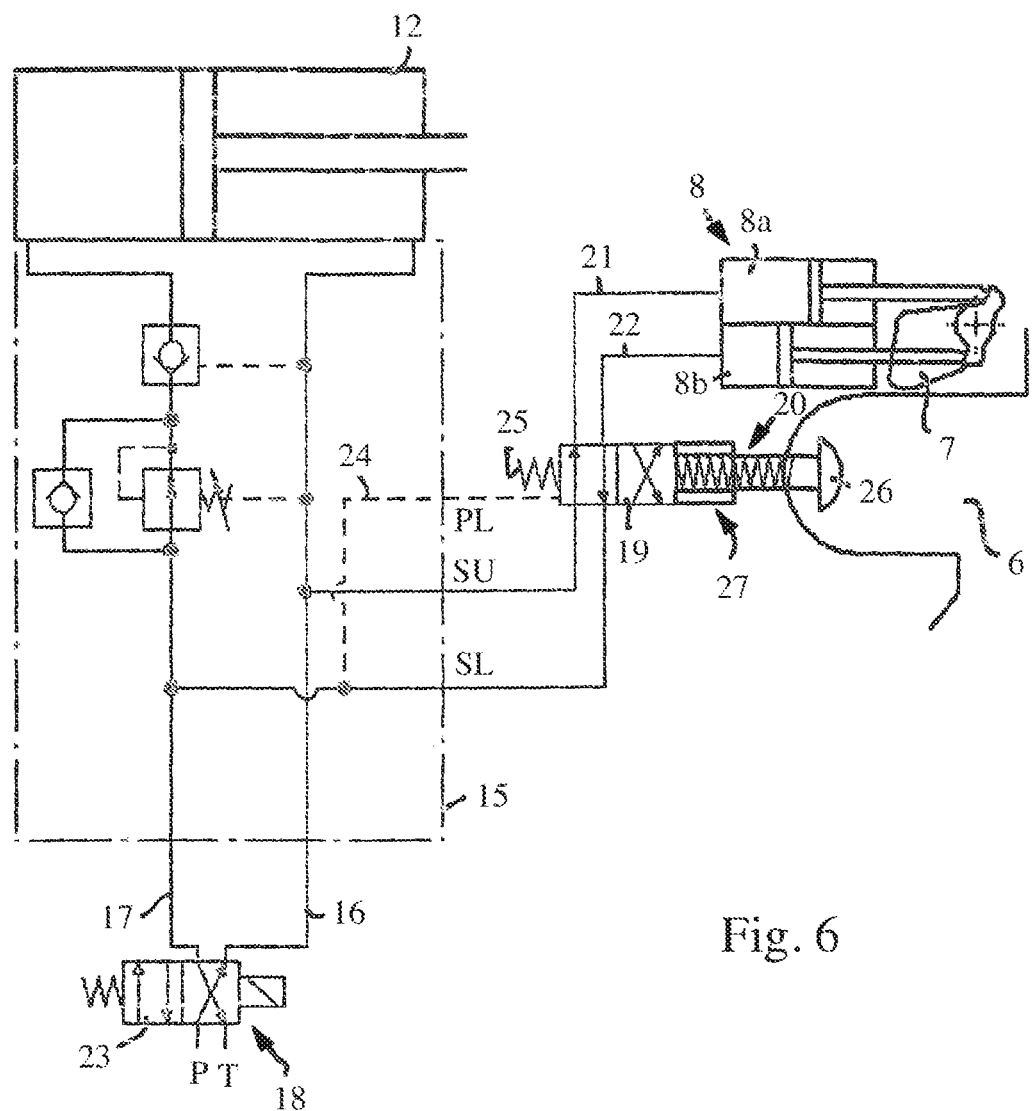
FIG. 6: a schematic representation of the pressure circuit of the two preceding Figures, with the completely unlocked and decoupled operating state being shown in which the first locking part is also moved out of the coupling mount and the sensor for controlling the switching valve is shown in its starting position.

The named sensor 20 can advantageously comprise a movable supported sensor head 26 which projects into the coupling mount 6 in a moved out position or is arranged such that the first locking part 13 collides with the sensor head on moving into the named coupling mount and presses it back. FIG. 6 shows the moved out sensor head position, whereas the FIGS. 4 and 5 show the moved in sensor head position. The named sensor head 26 can in this respect be supported displaceably in translation, but can also be a pivotable toggle switch or rocker switch or can be movably supported in another suitable manner.

In this respect, a sensor head coupling 27 is advantageously provided between the sensor head 26 and the switching valve 19, the sensor coupling being able to be switched to and fro cyclically between two coupling states in the manner of a ballpoint pen actuation mechanism by actuating the sensor head 26. The named sensor coupling 27 can in particular comprise a transfer means 28 which is arranged between the switching valve 19 and the sensor head 25 and can be fixed at the named sensor head 26 in two different positions, in particular in a long position and in a short position, i.e. in one position the sensor head 26 with the transfer means 28 is long and in another position it is short.

The following mechanism and the following function can advantageously be realized in this respect: in the operating position shown in FIG. 4, in which the installation tool is coupled and the two locking axles 13 and 14 are locked in the coupling mount 6 or in the locking mount 10 respectively, the locking pressure connection 17 is pressurized by a corresponding position of the switching valve 23 so that control pressure is transferred via the control line 24 to the switching valve 19 and the latter is switched into the switching position shown in FIG. 4 which will be called the "second" switching position in the following. In this second switching position, the locking pressure is switched through from the locking pressure connection 17 onto the locking setting actuator 8b so that the securing element 7 is also securely held in the locking position. The named locking pressure from the locking pressure connection 17 is naturally also transferred onto the setting actuator 12 of the main lock so that the main lock is also closed.

The unlocking pressure connection 16 is connected in a pressure-free manner or is applied to the tank via the switching valve 23. Via the switching valve 19, the unlocking setting actuator 8a of the securing element 7 is also connected in a pressureless manner via the pressure line 21 and the connection line SU, cf. FIG. 4.

If the quick-coupler 1 is opened, cf. FIG. 5, the two locking axles 13 and 14 are first in the coupling mount 14 or locking mount 10 respectively. However, the unlocking side, i.e. the unlocking pressure mechanism 16, is now pressurized by switching the switching valve 13, while the locking pressure connection 17 is pressureless or is connected to the tank, cf. FIG. 5. On the one hand, the main lock cylinder 12 moves in and the main lock is unlocked by the pressure on the unlocking pressure connection 16. On the other hand, the unlocking pressure moves via the connection line SU into the unlocking setting actuator 8a of the securing element 7. The locking actuator 8b is moved in by the moving out of the unlocking actuator 8a, with the fluid displaced out of the locking actuator 8b in this process being able to flow via the line SL into the locking pressure line or being able to flow off via the locking pressure connection 17 which is connected to the tank, cf. FIG. 5.

If the installation tool 4 is then decoupled, i.e. if the two locking axles 13 and 14 are removed from the coupling mount and locking mount 6 and 10, the sensor 12 can move out again since it is no longer hindered from doing so by the locking axle 13. The sensor head 25 can be correspondingly preloaded, for example by a spring 29, for this purpose. The sensor coupling 27 switches into its movement-transmitting position, i.e. the previously described "long" position, by the moving out of the sensor head 26. In this respect, in the unlocking operating position shown in FIG. 6, continuous pressure is still on the unlocking pressure connection 16 which is correspondingly transferred into the unlocking chamber of the setting actuator 12 and into the unlocking setting actuator 8a.

Figure 7:
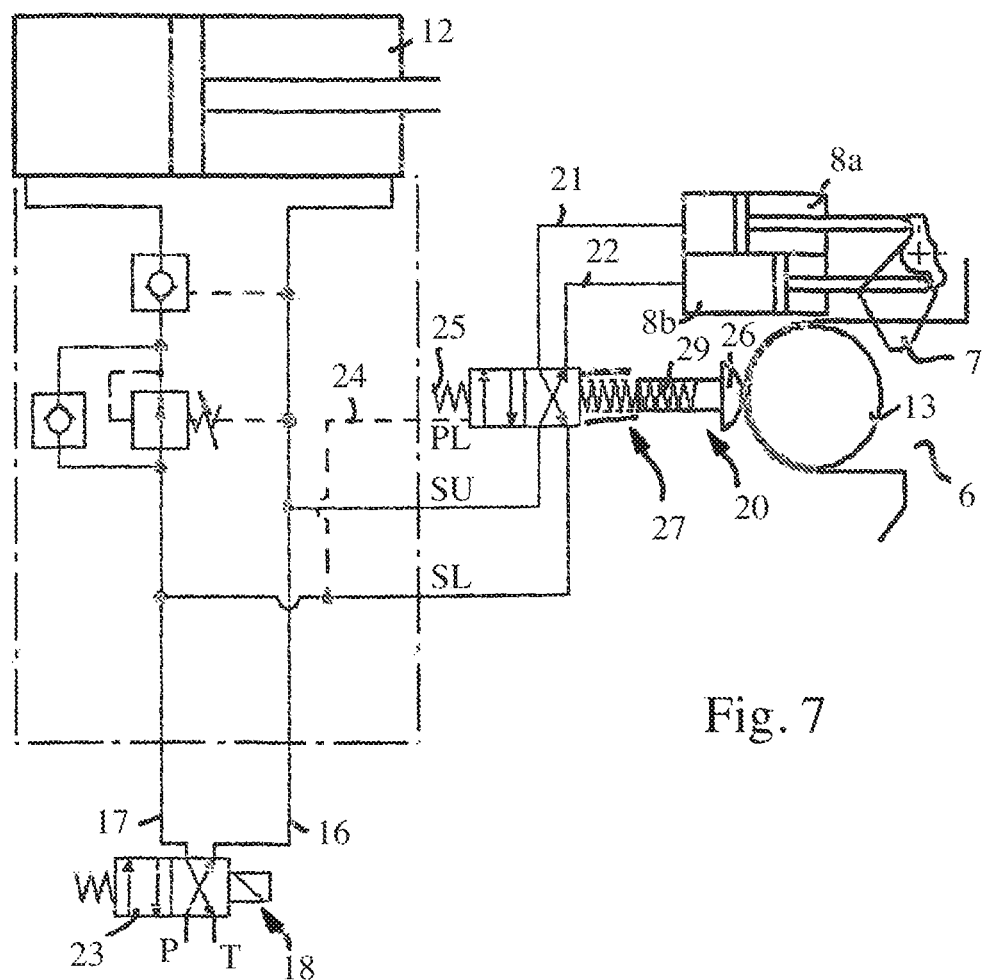
FIG. 7: a schematic representation of the pressure circuit of the preceding Figures, with a further operating state being shown in which a first locking part is moved into the coupling mount and the securing element of the coupling mount is locked, but the main lock is still unlocked.

If a new installation device is coupled on and if the first locking axle 13 is moved into the coupling mount 6, as FIG. 7 shows, the sensor 20 is pushed back, with the sensor head 28 switching over the switching valve 19 via the blocking or movement-transmitting sensor coupling 27 so that the latter moves into its first switching position, cf. FIG. 7. In this switching position, the—still pressurized—unlocking pressure connection 16 is applied to the locking setting actuator 8b, whereas, on the other hand, the unlocking setting actuator 8a is connected via the connection line SL to the locking pressure connection 17 and thus to the tank. The named locking pressure connection 17 is still pressureless so that fluid displaced from the unlocking actuator 8a can flow into the tank. The unlocking pressure of the main lock in this operating state locks the securing element 7 at the coupling mount 6. The switching valve 19 initially remains in the named position. A control pressure is not applied since the locking pressure connection 17 is pressureless.

Figure 8:
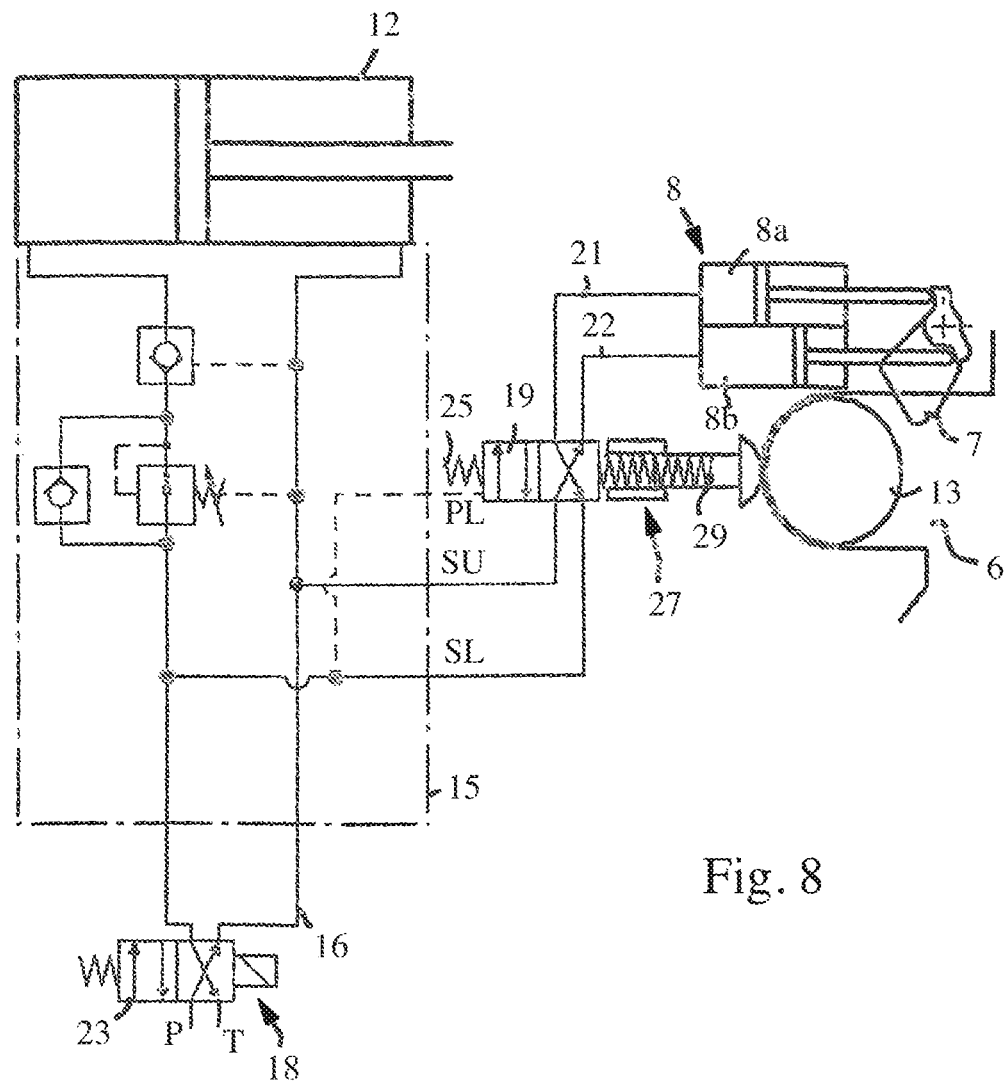
FIG. 8: a schematic representation of the pressure circuit similar to FIG. 7, with the switchover process of the sensor coupling being shown which takes place before application of the locking pressure of the main lock.

As FIG. 8 shows, once the completely pressed-down position of the sensor 20 is reached, the sensor coupling 27 can be switched over again, i.e. can move into the freedom of movement position. The switching valve 19 nevertheless does not initially change its position since no control pressure is applied and the spring 29 holds the switching valve in the named position, cf. FIG. 8.

Figure 9:
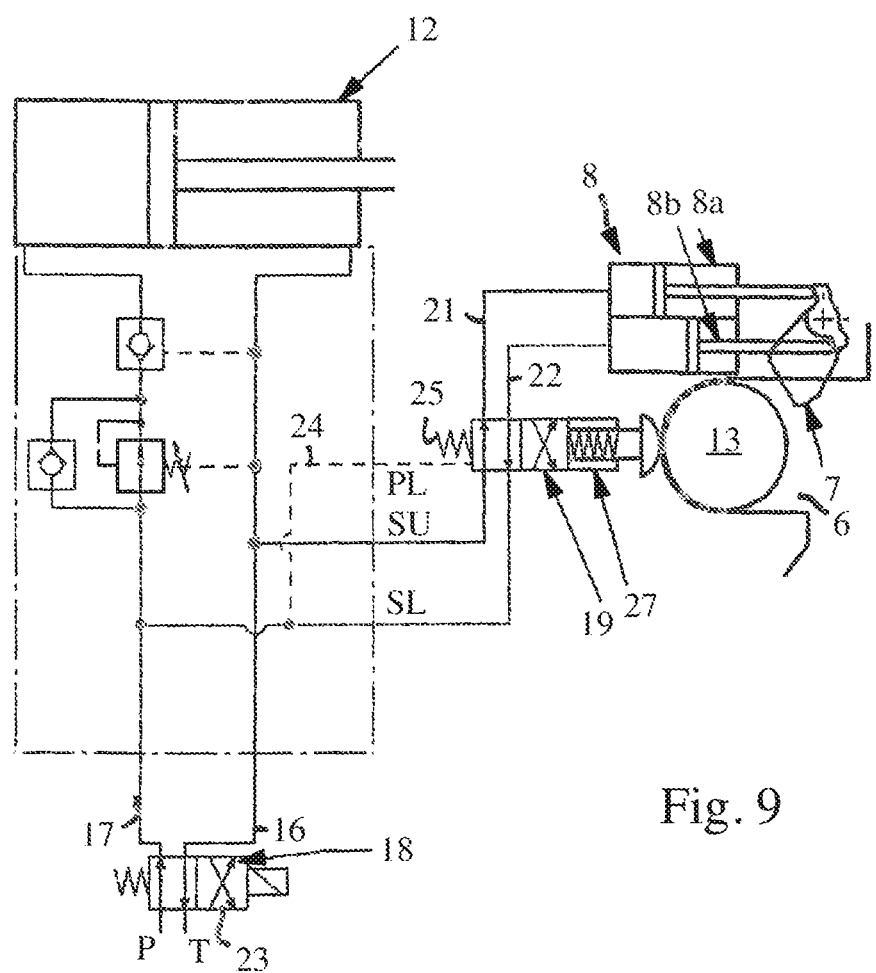
FIG. 9: a schematic representation of the pressure circuit of the preceding Figures, with in turn the completely locked operating state being shown after the locking pressure of the main lock has been applied and the control pressure split off therefrom has moved the switching valve back into its locking position in which the locking pressure of the main lock is transferred to the locking cylinder of the securing element.

Only when the pressure conditions of the pressure circuit 15 are varied by the switching of the switching valve 23, i.e. when pressure is transferred to the locking pressure connection 17 and the unlocking pressure connection 16 is depressurized or is connected to the tank, does the switching valve 19 switch and in so doing utilizes the freedom of movement of the sensor coupling 27, so-to-say. The locking pressure from the locking pressure connection 17 moves via the control pressure line 24 as a control pressure to the switching valve 19 so that the latter is again brought into the second switching position against the preload of the spring 29, cf. FIG. 9. In this second switching position, the locking pressure is then again transferred to the locking chamber or the locking setting actuator 8b of the securing element 7, whereas the unlocking setting actuator 8a is switched to the pressureless unlocking pressure connection 16.

As FIGS. 10 to 14 show, such a sensor-actuated, switching valve-controlled connection of the securing element 7 to the pressure circuit 15 can also be realized with only one setting actuator 8 for the securing element 7.

In contrast to the first embodiment in accordance with FIGS. 4 to 9, only one setting actuator is associated with the securing element 7; it is configured as an unlocking actuator 8a and unlocks the securing element 7 on pressurization. The securing element 7 is locked by means of preloading, for example by a spring 9 which forces or preloads the securing element 7 and/or the setting actuator 8a into the locking position as much as is possible. On the moving of the locking part 13 into the coupling mount 6, the securing element 7 can be pushed open while overcoming the named preload so that the locking part 13 can move in. As soon as the locking part 13 has completely moved in, the securing element 7 then snaps back into the locking position under the action of the spring 29.

The setting actuator 8a is only used for unlocking the securing element 7.

Figure 10:
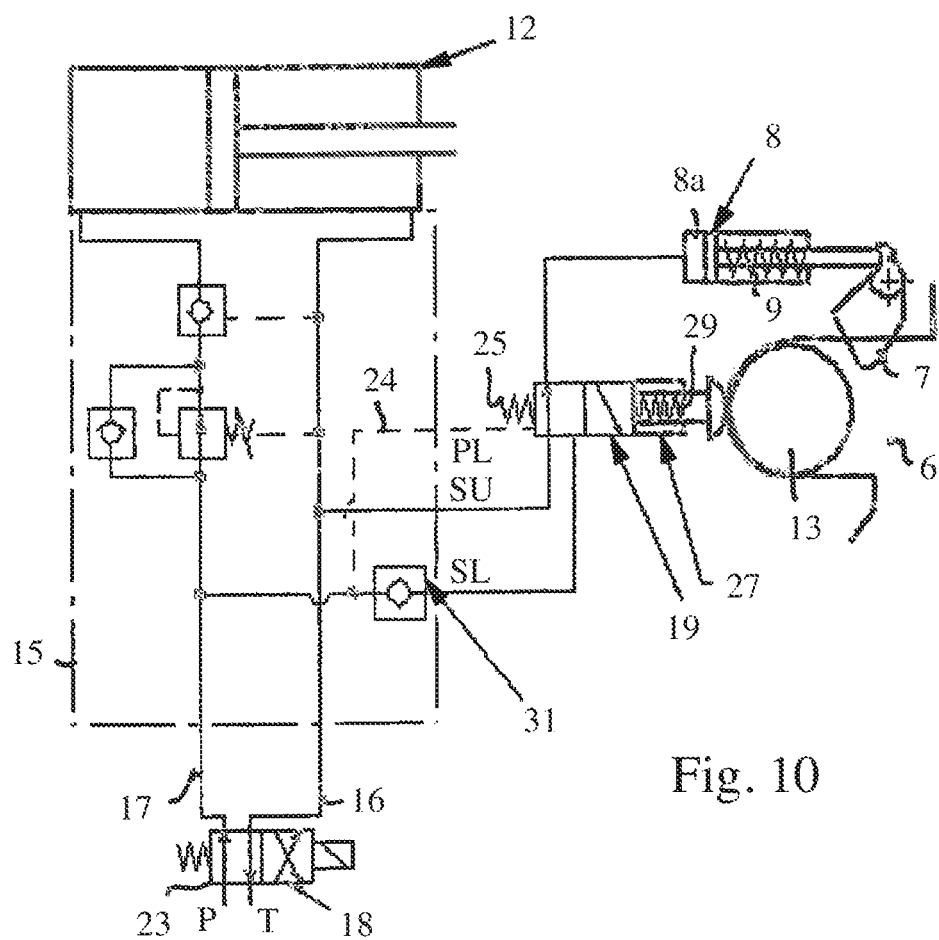
FIG. 10: a circuit diagram of the common pressure circuit for actuating the securing element associated with the coupling mount and the locking element associated with the locking mount in accordance with a second advantageous embodiment, wherein only one setting actuator is associated with the securing element and the switching valve is shown in an operating position in which the main lock and the securing element are both locked.

As FIG. 10 shows, with a completely coupled, completely locked operating state of the quick-coupler 1, the switching valve 19 is in a switching position in which the unlocking chamber of the unlocking actuator 8a is connected through to the unlocking pressure connection 16 of the main lock so that the setting actuator 8a is also switched to pressureless since the named unlocking pressure connection 16 is connected to the tank in the named operating position. The pressure from the locking pressure connection 17 is transferred via the control pressure line 24 to the switching valve 19 so that the latter remains in the named position which will be called the "second" switching position in the following. On the other hand, the locking pressure from the locking pressure connection 17 cannot move to the switching valve 19 or to the connection line SL since a check valve 31 prevents this, cf. FIG. 10.

If the quick-coupler 1 is opened, the two locking axles 13 and 14 initially still remain in the mounts 6 and 10. By switching over the switching valve 23, however, the pressure conditions in the pressure circuit 15 change so that the unlocking pressure connection 16 is pressurized, while the locking pressure connection 17 is connected to the tank in a pressureless manner. This, on the one hand, results in the unlocking of the setting actuator 12 or of the locking element 11 connected thereto. On the other hand, the unlocking pressure from the unlocking pressure connection 16 moves via the switching valve 19 into the setting actuator 8 so that the securing element 7 is also unlocked.

Even if the control pressure onto the switching valve 19 fails, since the locking pressure connection 17 is pressureless, the switching valve 19 initially remains in the position shown in FIG. 10 since it is held in this position by the spring 25.

Figure 11:
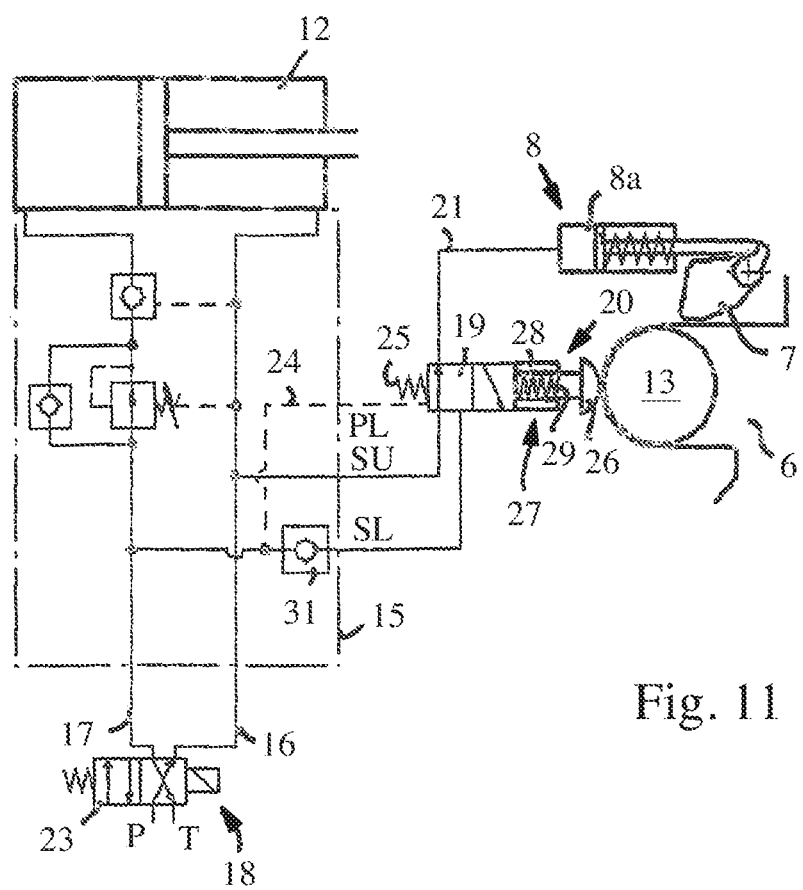
FIG. 11: a schematic representation of the pressure circuit similar to FIG. 10, wherein the main lock and the securing element are both unlocked and no locking element is received in the coupling mount, i.e. the quick-coupler is decoupled.

If the locking axles 13 and 14 are removed from the mounts 6 and 10, the sensor 20 can move out in the previously described manner, cf. FIG. 11, with the sensor coupling 27 again switching forward and blocking the sensor head 26 in its "long" configuration or making it movement-transmitting. The pressure conditions in the configuration of the pressure circuit 15 shown in FIG. 11 in this respect initially remain unchanged, i.e. the unlocking pressure connection 16 is pressurized and the locking pressure connection 17 is pressureless. The securing element 7 is in the locking position through the spring preload.

Figure 12:
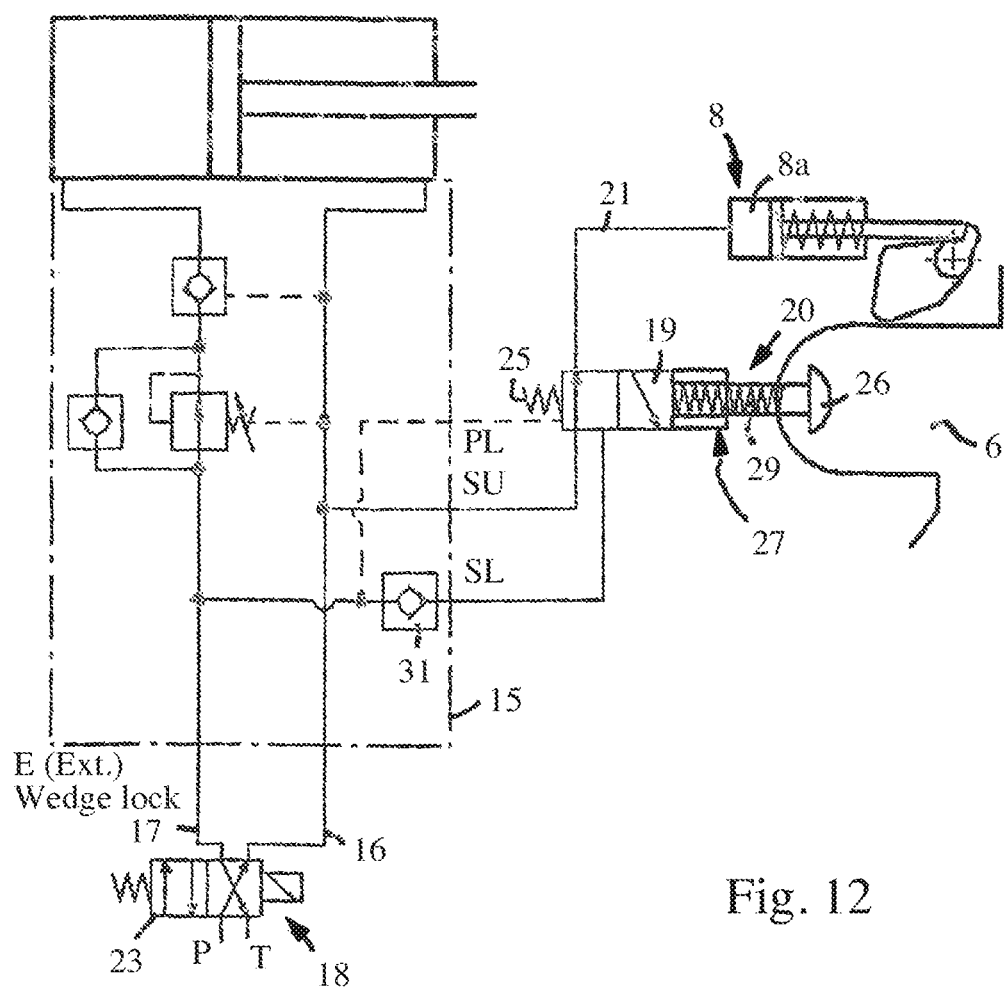
FIG. 12: a schematic representation of the pressure circuit of the two preceding Figures, with a further operating state being shown in which a first locking part is moved into the coupling mount and the sensor has switched the switching valve so that the securing element can lock while the main lock is still unlocked.

If now, as shown in FIG. 12, a new tool is taken up and its first locking axle 13 is moved into the coupling mount 6, the sensor 20 pushes the switching valve 19 into the "first" switching position shown in FIG. 12 in which initially no control pressure is transferred to the switching valve 19 since the locking pressure connection 17 is still pressureless in order still to keep the main lock open and to allow the moving in of the second locking axle 14.

Figure 13:
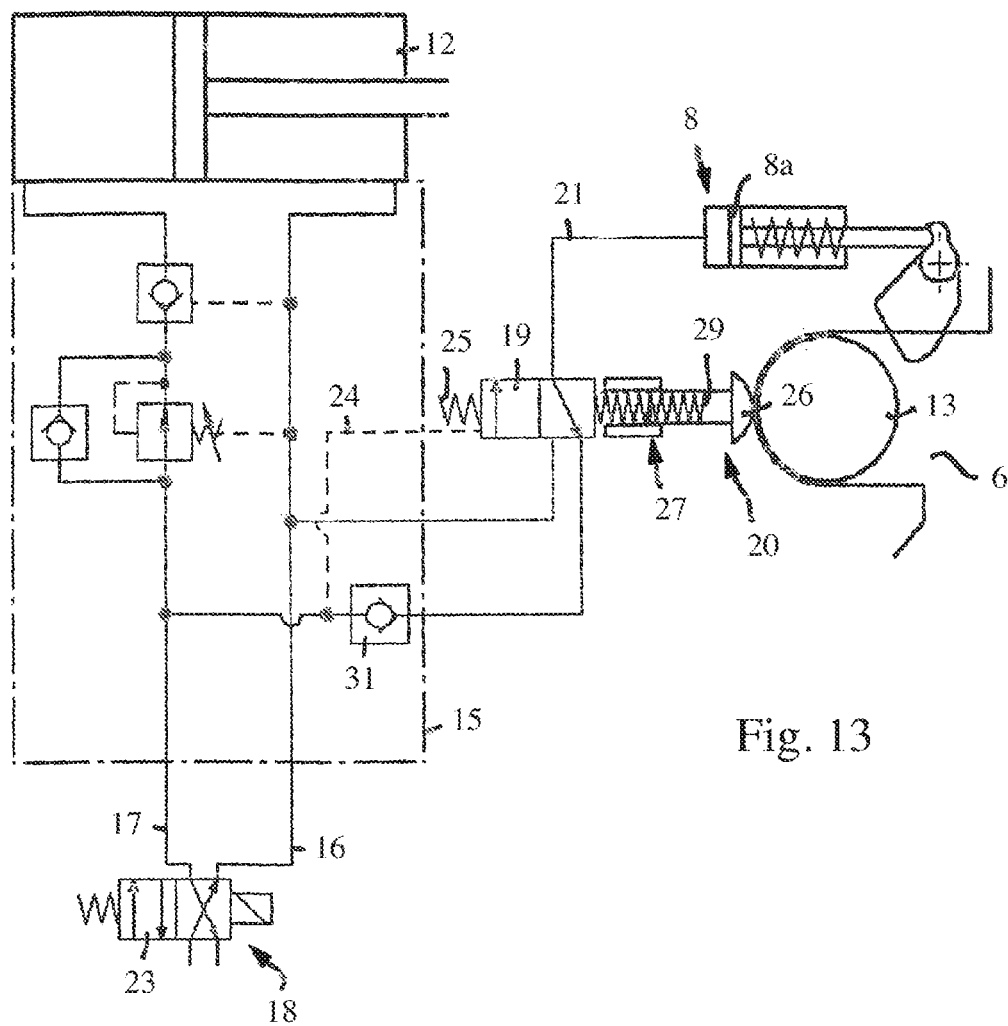
FIG. 13: a schematic representation of the pressure circuit similar to FIG. 12, wherein the switching process of the sensor coupling is shown which allows the switching valve also to switch back with a pressed-in sensor.

As FIG. 13 shows, in this completely moved in position of the sensor 20, the sensor coupling 27 can again switch forward, i.e. can switch into the freedom of movement position in which the switching valve 19 is then movable again.

Figure 14:
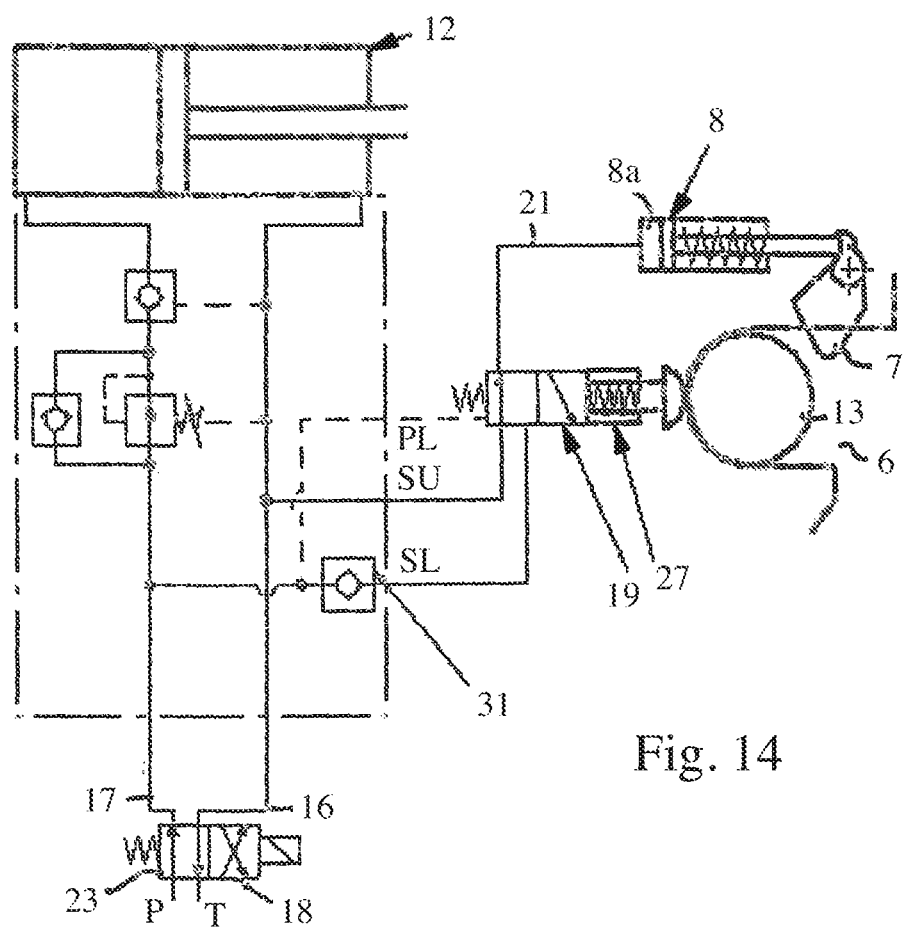
FIG. 14: a schematic representation of the pressure circuit of FIG. 13, wherein a further operating state is shown in which, after switching over the sensor coupling, the main lock is also locked and the control pressure branched off from the locking pressure line of the main lock has switched the switching valve back so that the unlocking chamber of the setting actuator of the securing element is again connected to the unlocking pressure line of the main lock.
Figure 15:
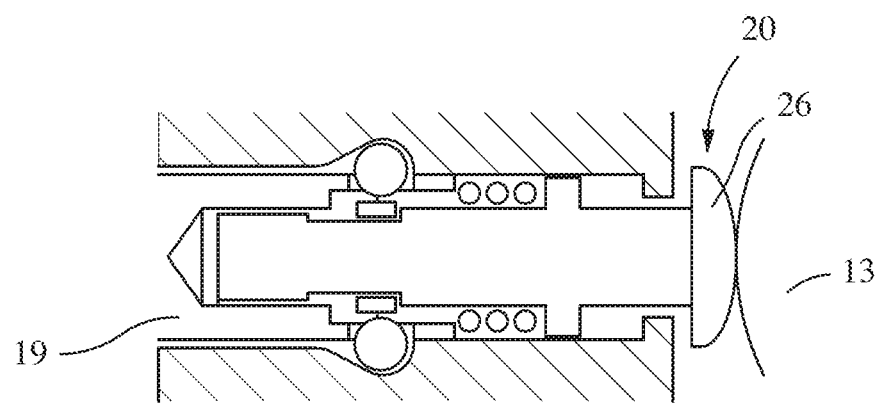
FIG. 15: a sectional view of a holding apparatus in the form of a latching apparatus for holding the switching valve against spring forces in dependence on a switching position of the sensor of the preceding Figures.

If the main lock is also locked after a complete reception of the installation tool, i.e. if pressure is again transferred to the locking pressure connection 17, cf. FIG. 14, this locking pressure moves from the locking pressure connection 17 via the control pressure line 24 onto the switching valve 19 again so that the latter again moves into the second switching position shown in FIG. 14. The operating position in which the quick-coupler is completely coupled and completely locked is thus again reached.

Figure 16:
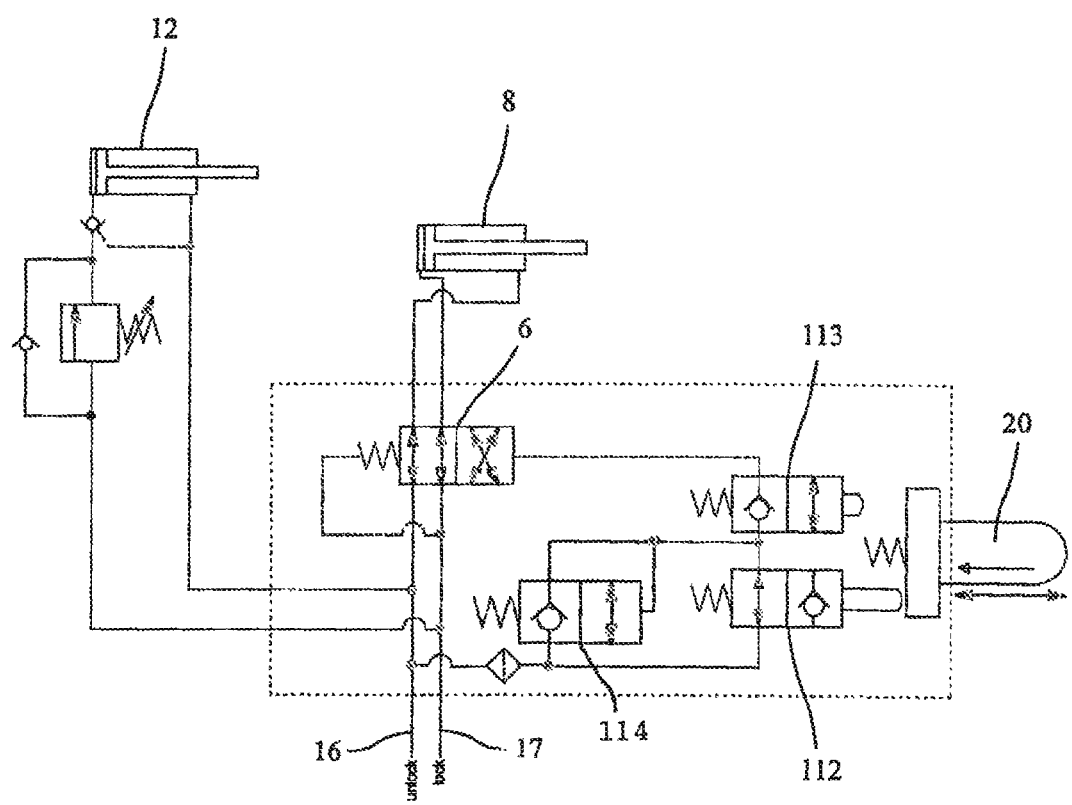
FIG. 16: a schematic representation of a common pressure circuit for actuating the securing element associated with the coupling mount and the locking element associated with the locking mount similar to FIG. 4, wherein in accordance with a further embodiment of the invention the sensor for controlling the switching valve is connected to the named switching valve hydraulically via a valve arrangement which controls the switching valve in dependence on the sensor position.

As FIG. 16 shows, the sensor 20 can also be hydraulically coupled to the switching valve 19 via a valve arrangement so that the switching valve 19 controls the named switching valve 19 via the valve arrangement and is itself actuated by the sensor 20.

As FIG. 16 shows, on the one hand, the setting actuator 12 for the locking element of the locking mount can be actuated by the unlocking pressure connection 16 and by the locking pressure connection 17, as was previously explained. On the other hand, the setting actuator 8 which actuates the securing element of the coupling mount 6 can be actuated by the two unlocking and locking connections or by the first and second pressure connections 16 and 17 via the switching valve 19. The named switching valve 19 can in this respect be pushed into a first switching position by a compression spring 109 and can be moved into the second switching position via a hydraulic control pressure against the force of the compression spring 109. A line 110 via which the switching valve 19 is additionally pushed into the first switching position by the pressure in the named pressure medium connection 16 in addition to the compression spring 109 can branch off from the locking pressure connection 17 downstream of the switching valve 19.

A control line 111 branches off from the second, or unlocking, pressure medium connection 16 downstream of the switching valve 19 and leads via a first valve 112 and a second valve 113 connected in series thereto to the switching valve 19 for the application of the control pressure to it. A third valve 114 is connected in parallel with the first valve 112 and is arranged in a line 115 which branches off from the control line 111 upstream of the valve 112 and opens into the control line 111 again between the first and second valves 112 and 113. A pilot line 116 for controlling the valve 114 branches off from the named line 115 downstream of the valve 114. The named valves 112, 113 and 114 are configured as directional valves which ensure a direction-independent free passage in an open position and a check function dependent on the flow direction in a blocked position.

Figure 17:
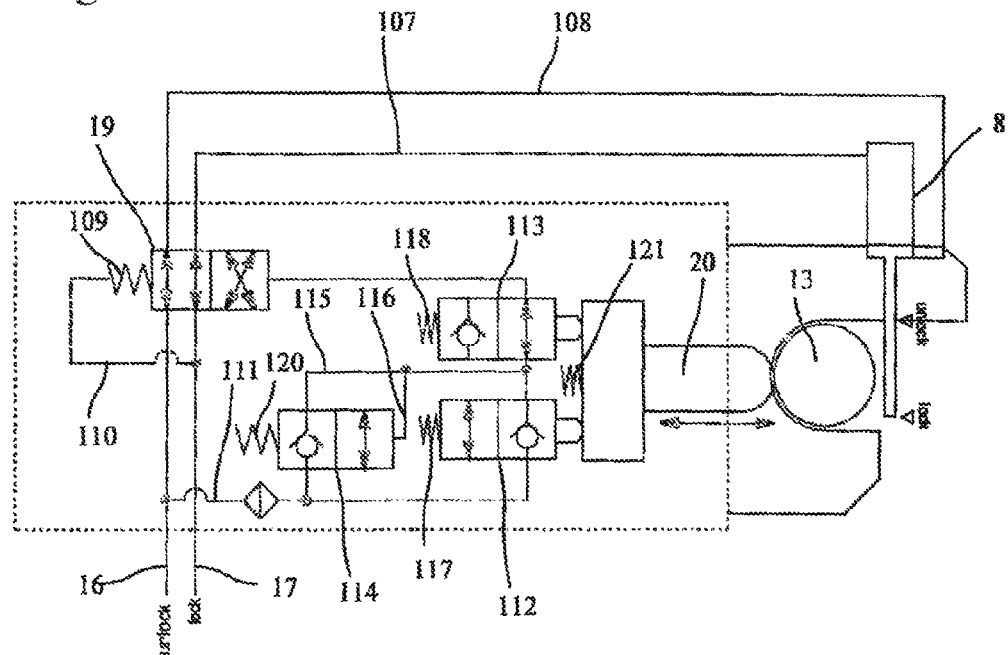
FIG. 17: the hydraulic connection of the sensor to the named switching valve in accordance with FIG. 16, with the securing element of the coupling mount being shown in its locking position.
Figure 18:
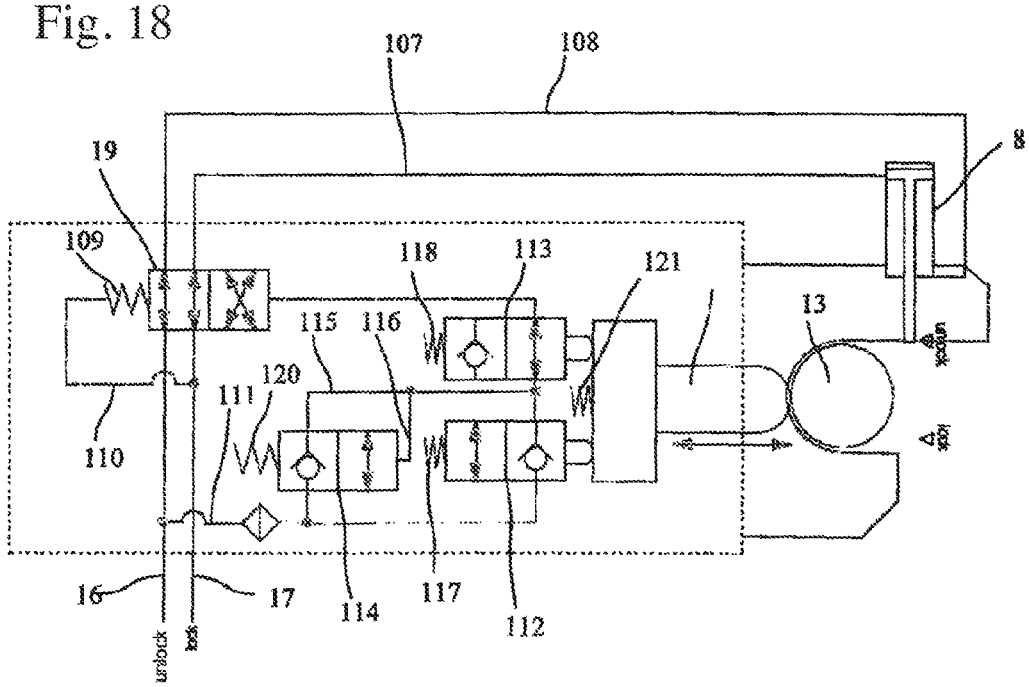
FIG. 18: a schematic representation of the valve arrangement and of the sensor of FIG. 17, with the securing element being shown in its unlocked position.
Figure 21:
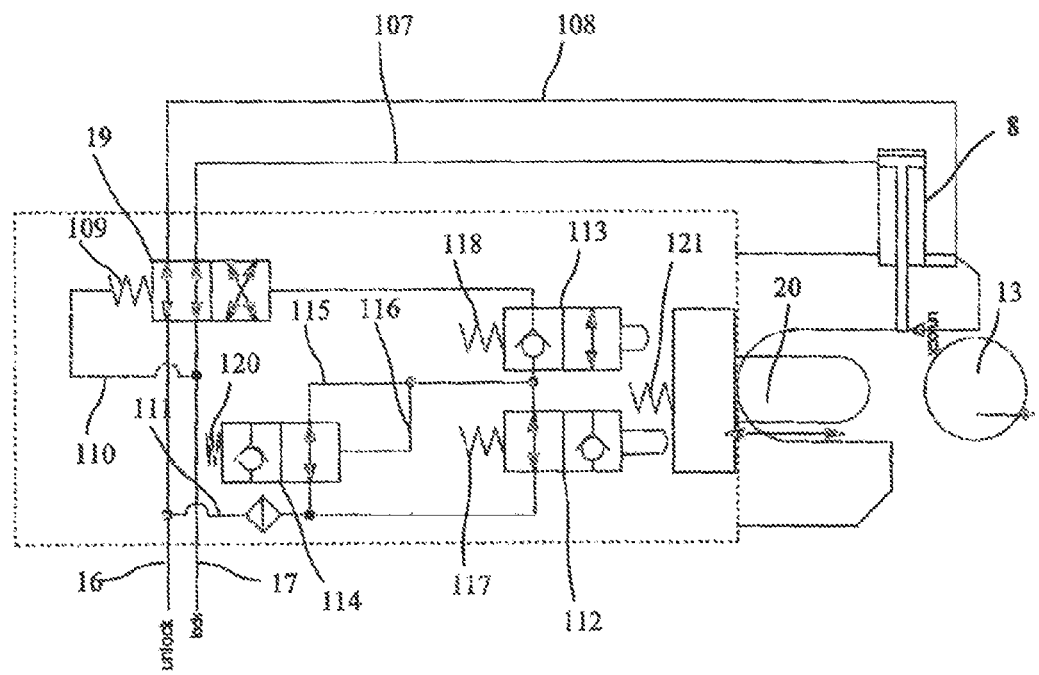
FIG. 21: the valve arrangement and the sensor of the preceding Figures in the starting position.

In the starting position in accordance with FIG. 21, the coupling element 13 is completely moved out of the mount 6 and the unlocking pressure connection 16 is pressurized. The first valve 112 is open in this starting position, while the second valve 113 is blocked and the third valve 114 is in turn open. The two valves 112 and 13 are each pushed into their named starting positions by a compression spring 117 or 118 respectively and can be actuated offset in time by the sensor 20 associated with the coupling element 13. The third valve 114 is pushed into an opening position by the pressure in the pilot line 116 against the force of a compression spring 120 in the starting position of FIG. 21. The sensor 20 in the shown embodiment is designed as a pressure plunger which can be actuated by the coupling element 13 and which is movable between the moved in position shown in FIG. 17 and the moved out position shown in FIG. 21. The setting element 19 is pushed by a compression spring 121 into the moved out position and is pushed into the moved in position by the coupling element 13 on its engagement into the mount 6. The two valves 112 and 113 are arranged such that, on an actuation of the sensor 20 out of the moved out position into the moved in position effected by the coupling element 13, first the first valve 112 is actuated and subsequently the second valve 113. The following function can hereby be realized:

In the locking position shown in FIG. 17, the locking pressure connection 17 is pressurized. The switching valve 19 is pushed into the shown first switching position in accordance with FIG. 17 by the compression spring 109 and by the pressure applied to the switching valve 19 via the line 110. The pressure applied to the locking pressure medium connection 17 is connected through via the first line 17 to the actuator 8 formed as a differential piston, for the displacement thereof into the shown locking position so that the coupling mount 6 is locked. The second pressure medium connection 16 is pressureless and the valves 112, 113 and 114 are without function.

To unlock the securing element 7, the unlocking pressure connection 16 is pressurized, while the locking pressure connection 17 becomes pressureless. The switching valve 19 continues to be held in the first switching position by the force of the compression spring 109. In this switching position, the pressure applied to the pressure medium connection 16 is transferred to the line 108 so that the setting actuator 8 unlocks. As long as the coupling element 13 is still in the shown moved in position, the first valve 112 is held via the sensor in the blocking position. Since the third valve 114 is also in the blocking position and there is thereby also no pressure applied in the lines 115 and 116, the third valve 114 also remains closed.

Figure 19:
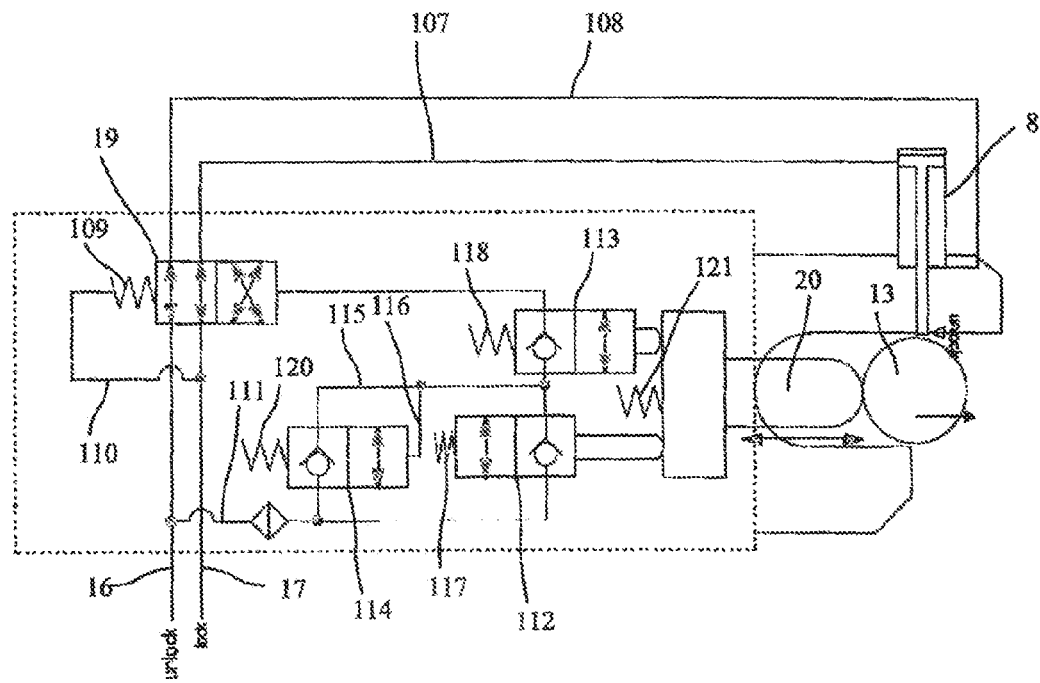
FIG. 19: a schematic representation of the valve arrangement and of the sensor of the preceding Figures, with the securing element being unlocked and the coupling part moving out of the coupling mount.

If the coupling element 13 in accordance with FIG. 19 is moved out of the mount 6, the second valve 113 is first switched over out of the open position into the blocking position, while the first valve 112 continues to remain blocked.

Figure 20:
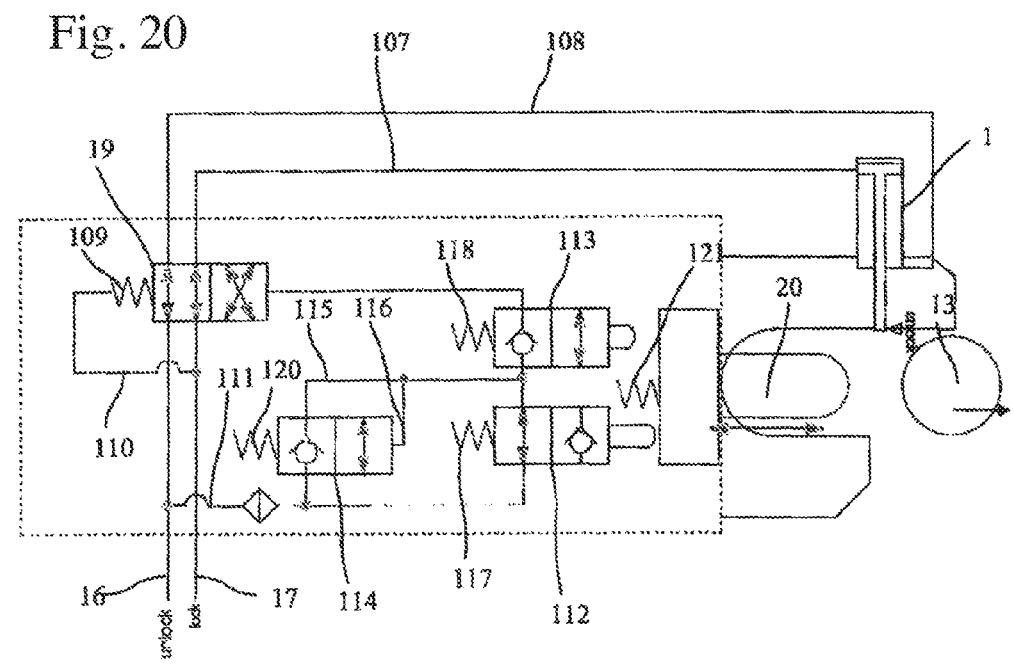
FIG. 20: the valve arrangement and the sensor of the preceding Figures, with the coupling element being completely moved out of the coupling mount.

On a further displacement of the coupling element 13 in accordance with FIG. 20, the sensor 20 acted on by the compression spring 121 moves into the moved out position shown in FIG. 20. In this respect, the first valve 112 is also switched over out of the blocking position into the open position.

As soon as the first valve 112 is open, the pressure present in the unlocking pressure connection 16 is applied to the line 115 and the third valve 114 is switched over in accordance with FIG. 21 via the pilot line 116 against the pressure of the compression spring 120 into the open position. The valve 114 is held in the open position in self-retention by the named pilot line 116.

Figure 22:
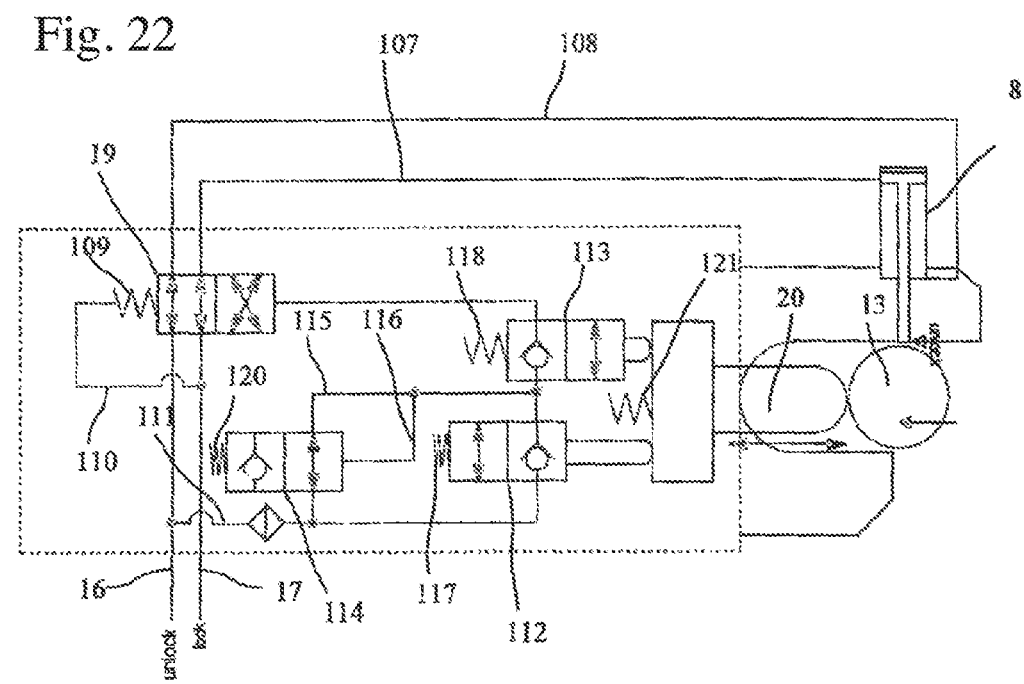
FIG. 22: the valve arrangement and the sensor of the preceding Figures, with the coupling part being moved into the coupling mount.
Figure 23:
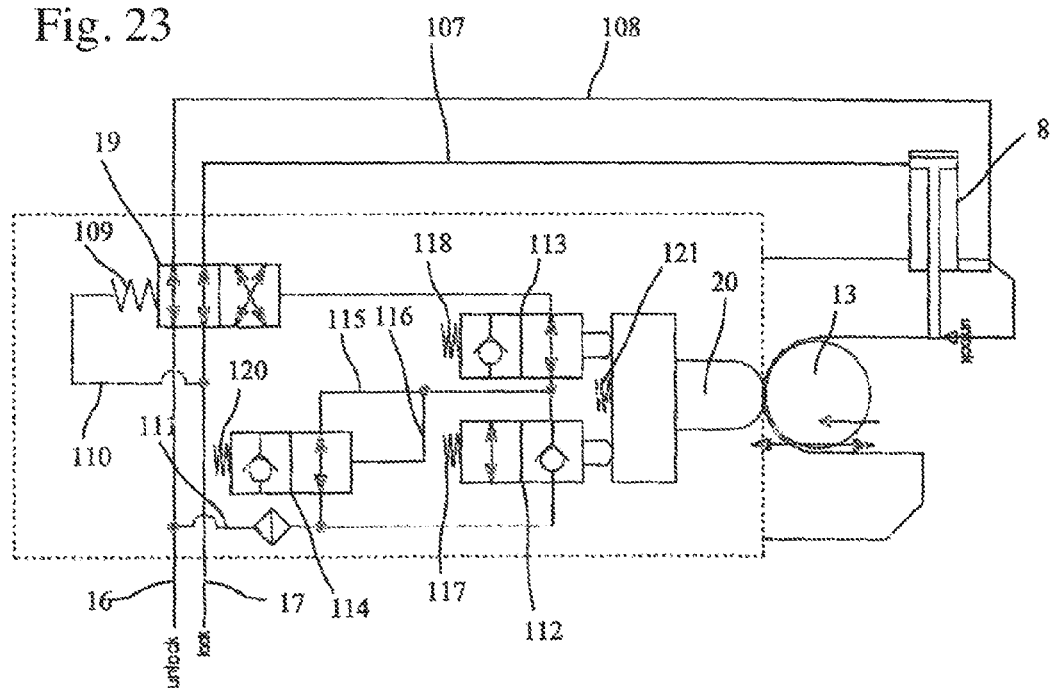
FIG. 23: an intermediate position of the valve arrangement and of the sensor of the preceding Figures with a coupling part completely moved into the mount.

In the position of FIG. 22, the unlocking pressure connection 16 continues to be pressurized and the securing element remains unlocked. If the coupling element 13 in accordance with FIG. 22 is again moved into the coupling mount, the first valve 112 is initially switched via the sensor 20 from the open position against the force of the compression spring 117 into the blocking position. The third valve 114 is still held in the open position against the force of the compression spring 120 due to the self-retention. The second valve 113 is still blocked in this intermediate position so that the control pressure applied via the open third valve 114 and the line 115 upstream of the second valve 113 is not yet switched through to the switching valve 19.

Only when the coupling element 13 in accordance with FIG. 32 moves on into the coupling mount is the second valve 113 switched over by the sensor 20 from the blocking position into the open position so that the control pressure applied at the second valve 113 is switched through to the switching valve 19 via the open third valve 114 and the line 115.

Figure 24:
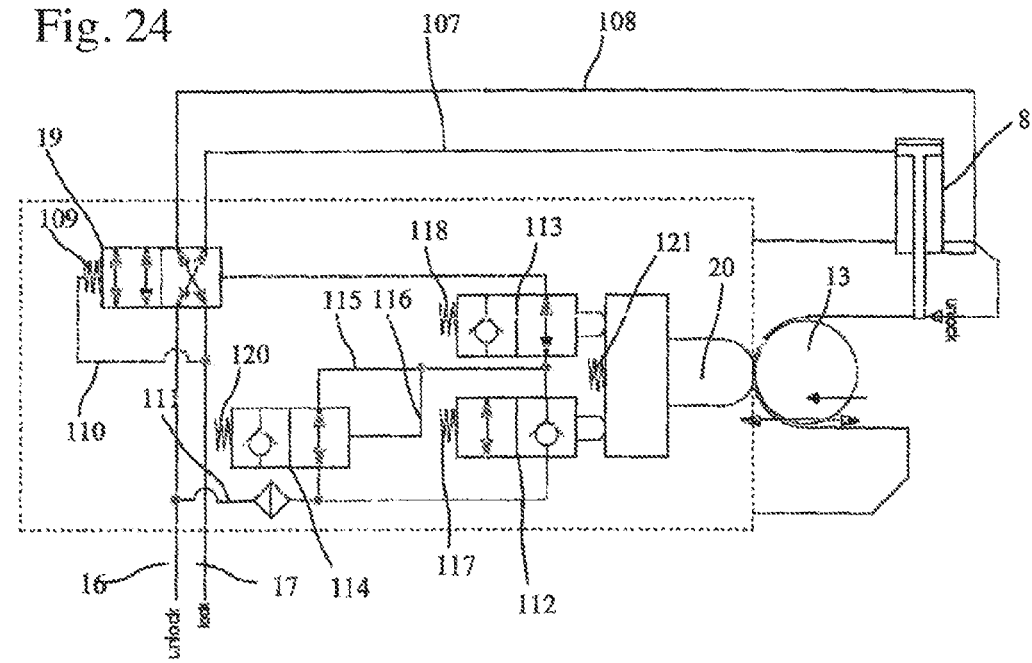
FIG. 24: the valve arrangement and the sensor of the preceding Figures with a completely moved in coupling element.

The switching valve 19 in accordance with FIG. 24 is switched over by the then applied control pressure into the cross-position so that the still pressurized unlocking pressure connection 16 is connected to the line 107 and the pressureless locking connection 17 is connected to the line 108.

Figure 25:
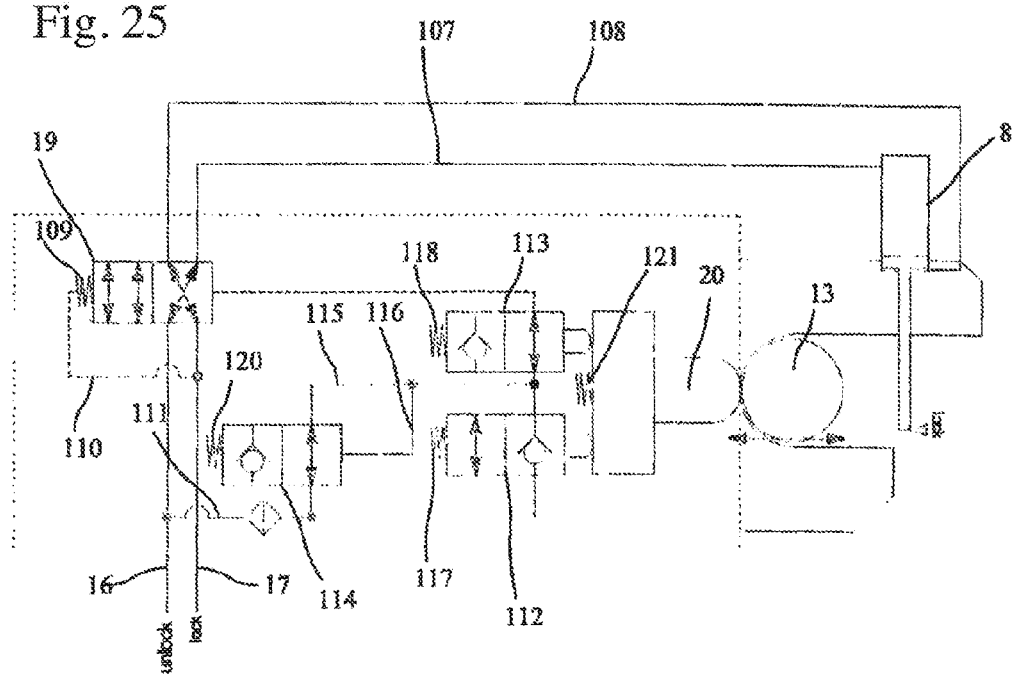
FIG. 25: the valve arrangement and the sensor of the preceding Figures with a completely moved in coupling element.

The securing element accordingly locks, as is shown in FIG. 25. The coupling element 13 is hereby already secured after moving into the coupling mount without any change of the pressurization from the unlocking pressure connection 16 to the locking pressure connection 17.

Figure 26:
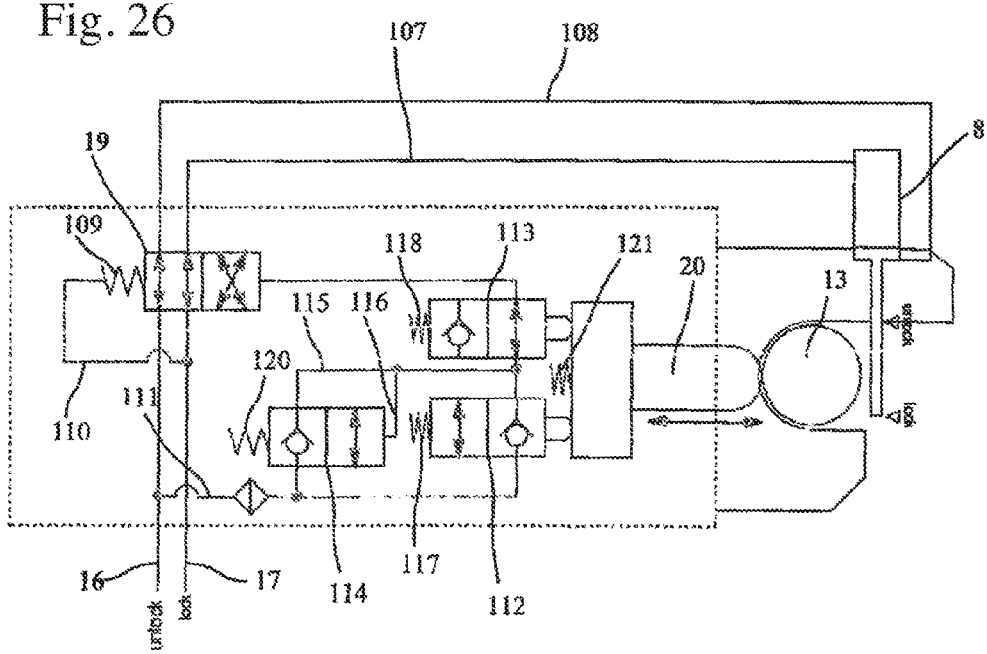
FIG. 26: the valve arrangement and the sensor of the preceding Figures, with the securing element of the coupling mount being located in the locking position.

If then the locking pressure connection 17 is pressurized and the unlocking pressure connection 16 becomes pressureless, the pressure in the line 115 can escape via the valves 112, 113 and 114 so that the switching valve 19 is again switched back into the first switching position by the force of the compression spring 106. Due to the lack of pressure in the pilot line 116, the third valve 114 in accordance with FIG. 26 returns to the blocked starting position again as a result of the force of the compression spring 120. The locking position shown in FIG. 17 is again adopted.

The invention claimed is:

1. A quick-coupler for coupling a tool to an excavator arm, comprising:
    a coupling mount for receiving a first locking part, and
    a locking mount for receiving a second locking part,
    wherein the coupling mount includes a securing element for capturing, securing, or both capturing and securing the first locking part in the coupling mount,
    wherein the locking mount includes a locking element for locking the second locking part in the locking mount,
    wherein a pressure medium can be applied to the securing element and the locking element,
    wherein the locking element can be actuated by a pressure circuit which comprises an unlocking pressure connection and a locking pressure connection,
    wherein the unlocking pressure connection and the locking pressure connection can be selectively connected to a pressure source or to a return line via a first switching valve,
    wherein the securing element of the coupling mount can be actuated by the pressure circuit, with the securing element being connected to the pressure circuit via a second switching valve,
    wherein the second switching valve is controlled by at least one sensor arranged at the coupling mount for sensing the locking part,
    wherein the quick-coupler further comprises first and second actuators for unlocking the securing element of the coupling mount and the locking element of the second mount, respectively,
    wherein the first switching valve is configured to selectively connect the unlocking pressure connection and the locking pressure connection of the actuator of the locking element of the locking mount either to the pressure source or the return line, and
    wherein the second switching valve is configured to selectively connect the actuator of the securing element of the coupling mount either to the unlocking pressure connection or the locking pressure connection of the actuator of the locking element.

2. A quick-coupler in accordance with claim 1, wherein the sensor is mechanically or hydraulically connected to the second switching valve.

3. A quick coupler in accordance with claim 1, wherein the sensor comprises a movably supported sensor head which can be actuated by the first locking part moving into or out of the coupling mount.

4. A quick coupler in accordance with claim 3,
    wherein the sensor comprises a sensor coupling which switches cyclically by sensor actuation between two coupling states,
    wherein, in a first of the two coupling states, the sensor head is connected to the second switching valve in a movement-transmitting manner in at least one direction, and
    wherein, in a second of the two coupling states, the sensor head has a freedom of movement with respect to the second switching valve in the at least one direction.

5. A quick-coupler in accordance with claim 4,
    wherein the sensor coupling comprises a transfer means which has different lengths or is fixed to the sensor head at different positions depending on the switching position, and
    wherein the transfer means is arranged between the sensor head and the switching valve.

6. A quick coupler in accordance with claim 1,
    wherein the second switching valve is preloaded into a first switching position and is connected to the pressure circuit via a control pressure line, and
    wherein the second switching valve can be brought into a second switching position by a control pressure in the control pressure line.

7. A quick-coupler in accordance with claim 6,
    wherein the control pressure line is connected to the locking pressure connection for locking the locking element of the locking mount,
    wherein, in the first switching position of the second switching valve, the locking pressure connection is connected to an unlocking chamber of the securing element for unlocking the locking element of the locking mount, and wherein, in the second switching position of the second switching valve, the locking pressure connection is connected to a locking chamber of the securing element for locking the locking element of the locking mount and the unlocking chamber of the securing element is connected in a pressureless manner to a tank of the pressure circuit.

8. A quick coupler in accordance with claim 1, wherein the securing element of the coupling mount can be locked and unlocked by means of two single-action setting actuators, including a first setting actuator having a locking chamber and a second setting actuator having an unlocking chamber.

9. A quick coupler in accordance with claim 1, wherein the securing element of the coupling mount can be locked and unlocked by means of a dual-action setting actuator having a locking chamber and an unlocking chamber.

10. A quick coupler in accordance with claim 1, wherein the securing element of the coupling mount can be unlocked by means of a single-action setting actuator and can be locked by means of a spring device.

11. A quick coupler in accordance with claim 1, wherein the sensor is hydraulically connected to the second switching valve via a valve arrangement.

12. A quick-coupler in accordance with claim 11, wherein the valve arrangement can be controlled by the sensor such that the securing element of the coupling mount can be moved into a locking position on a pressurization of the unlocking pressure connection.

13. A quick-coupler in accordance with claim 12, wherein the valve arrangement is configured so that the securing element remains in the locking position when the coupling element is moved into the coupling mount such that the sensor is moved when pressurization is changed from the unlocking pressure connection to the locking pressure connection.

14. A quick-coupler in accordance with claim 11, wherein the valve arrangement comprises two valves which can be switched by the sensor, offset in time with respect to one another.

15. A quick-coupler in accordance with claim 14, wherein the two valves are connected to one another in series.

16. A quick-coupler in accordance with claim 15,
wherein the valve arrangement further comprises a third valve which is connected in parallel with a first valve of the two valves, and
wherein the third valve can be switched by the pressure downstream of the first valve.

17. A quick-coupler in accordance with claim 1, wherein the sensor arranged at the coupling mount detects whether a first locking pin is in the coupling mount, moving into the coupling mount, or moving out of the coupling mount.

18. A quick-coupler in accordance with claim 1, wherein the coupling mount and the locking mount are rigidly fixed and cannot be moved relative to each other.

* * * * *